APPARATUS FOR ATTACHING TERMINAL CARDS TO WIRES

Filed April 19, 1951

16 Sheets-Sheet 1

INVENTORS:
K. H. ANDREN
C. J. ROACH
BY E. F. Kane
ATTORNEY

APPARATUS FOR ATTACHING TERMINAL CARDS TO WIRES

Filed April 19, 1951

16 Sheets-Sheet 2

INVENTORS:
K. H. ANDREN
C. J. ROACH

BY [signature]

ATTORNEY

INVENTORS:
K. H. ANDREN
C. J. ROACH
BY E. A. Kane
ATTORNEY

INVENTORS:
K. H. ANDREN
C. J. ROACH
BY
E. H. Kane
ATTORNEY

INVENTORS:
K. H. ANDREN
C. J. ROACH
BY E. A. Kane
ATTORNEY

APPARATUS FOR ATTACHING TERMINAL CARDS TO WIRES

Filed April 19, 1951

INVENTORS:
K. H. ANDREN
C. J. ROACH
BY E. A. Kane
ATTORNEY

APPARATUS FOR ATTACHING TERMINAL CARDS TO WIRES

INVENTORS:
K. H. ANDREN
C. J. ROACH

BY E. F. Kane
ATTORNEY

May 17, 1955 K. H. ANDREN ET AL 2,708,459

APPARATUS FOR ATTACHING TERMINAL CARDS TO WIRES

Filed April 19, 1951 16 Sheets-Sheet 8

INVENTORS:
K. H. ANDREN
C. J. ROACH

BY [signature]

ATTORNEY

APPARATUS FOR ATTACHING TERMINAL CARDS TO WIRES

Filed April 19, 1951

INVENTORS:
K. H. ANDREN
C. J. ROACH
BY E. F. Kane
ATTORNEY

May 17, 1955 K. H. ANDREN ET AL 2,708,459

APPARATUS FOR ATTACHING TERMINAL CARDS TO WIRES

Filed April 19, 1951

16 Sheets-Sheet 10

INVENTORS:
K. H. ANDREN
C. J. ROACH

BY E. A. Kane

ATTORNEY

APPARATUS FOR ATTACHING TERMINAL CARDS TO WIRES

Filed April 19, 1951

INVENTORS:
K. H. ANDREN
C. J. ROACH
BY E. F. Kaul
ATTORNEY

May 17, 1955 K. H. ANDREN ET AL 2,708,459
APPARATUS FOR ATTACHING TERMINAL CARDS TO WIRES
Filed April 19, 1951 16 Sheets-Sheet 12

INVENTORS:
K. H. ANDREN
C. J. ROACH
BY E. F. Kane
ATTORNEY

May 17, 1955 K. H. ANDREN ET AL 2,708,459

APPARATUS FOR ATTACHING TERMINAL CARDS TO WIRES

Filed April 19, 1951 16 Sheets-Sheet 13

INVENTORS:
K. H. ANDREN
C. J. ROACH

BY E. A. Kane
ATTORNEY

INVENTORS:
K.H. ANDREN
C.J. ROACH
BY E. F. Kane
ATTORNEY

INVENTORS:
K. H. ANDREN
C. J. ROACH
BY
E. F. Kane
ATTORNEY

May 17, 1955 K. H. ANDREN ET AL 2,708,459

APPARATUS FOR ATTACHING TERMINAL CARDS TO WIRES

Filed April 19, 1951

16 Sheets-Sheet 16

INVENTORS:
K. H. ANDREN
C. J. ROACH

BY E. H. Kane

ATTORNEY

United States Patent Office 2,708,459

Patented May 17, 1955

2,708,459

APPARATUS FOR ATTACHING TERMINAL CARDS TO WIRES

Karl H. Andren, Greenfield, Wis., and Charles J. Roach, Oak Park, Ill., assignors, by direct and mesne assignments, to Western Electric Company, Incorporated, New York, N. Y., a corporation of New York Application April 19, 1951, Serial No. 221,911

18 Claims. (Cl. 140—1)

This invention relates to a method of and apparatus for attaching terminals to a plurality of wires at intervals longitudinally thereof to form components of telephone switching systems and more particularly to a method of an apparatus for forming a string of ladder-like structures of cards with terminals thereon electrically connected to pairs of twisted wires at spaced intervals.

This invention is an improvement of the method and apparatus disclosed in Patent No. 2,551,358 to K. H. Andren on a terminal wiring apparatus.

It is an object of the present invention to provide an economical method of and high production apparatus for forming wire components of electrical switching systems.

In carrying out this method of making a continuous string of wired components of telephone switching equipment, an apparatus is provided having means for intermittently feeding cards of insulating material having a plurality of terminals thereon to a clinching station of the apparatus and guiding a plurality of strands of wires from supply reels into alignment with and above the terminals at the clinching station. A punch and die at the clinching station is actuated to clinch the terminals of successive cards onto the wires and after each clinching operation an intermittent feed advances the wires a predetermined distance so that the terminals and the cards are attached to the wires in regularly spaced relation to each other and when a predetermined number of cards, as for example ten, have been attached to the wires an auxiliary feed advances the wires an additional amount to provide relatively long lengths of wires between successive groups or ladders of ten cards to form a string of ladders of ten cards each connected together in spaced relation to each other by relatively long lengths of wire. Rotatable elements twist each pair of wires about themselves a definite number of turns, preferably six, in opposite directions alternately between successive cards. At intervals between successive ladders and between the cards at the middle of each ladder the wires are twisted an extra half turn alternately in opposite direction to reverse the position of attachment of the wires of each pair to corresponding terminals on one half of the cards of each ladder with respect to corresponding terminals on the other half of each ladder.

A feature of the invention is the provision of rotatable and axially movable elements for twisting adjacent pairs of the wires about themselves and the provision of a comb-like member engageable with the wires as the wires leave the elements and cooperating with the elements for spacing and positioning portions of each pair of wires in parallel and vertical alignment with the terminals on a card at the clinching station.

Another feature of the invention is the provision of a drive mechanism for rotating the wire twisting elements a predetermined number of complete turns in opposite directions between successive cards and means cooperating with the drive mechanism and operable under control of a suitable timing device for adding or subtracting one half turn of twist to the predetermined number of turns of wire alternately in opposite directions at selected intervals along the pairs of continuous wires.

A further feature of the invention is the wire feed in which one component thereof serves to advance the wires a predetermined distance after a card has been attached to the wires to space the cards equal distances apart and another component thereof serves to feed additional lengths of wire to separate groups of predetermined numbers of cards from each other to form ladders and provide relatively long lengths of wires interconnecting the ladders.

Control mechanism cooperating with the wire feed for selectively determining the length of wire fed between successive ladders and for determining the number of cards in each ladder is also a feature of the invention.

A still further feature is the provision of means in the wire feed for releasably engaging the wire and means for reversing the feed to retract the wire to remove the slack accumulated in some of the wires.

Other objects of the invention and features of construction will become apparent by reference to the following detailed description thereof and the accompanying drawings illustrating a preferred embodiment of the invention, in which Fig. 1 is a side elevational view of the apparatus embodying the present invention;

Figures 1, 2, 3:
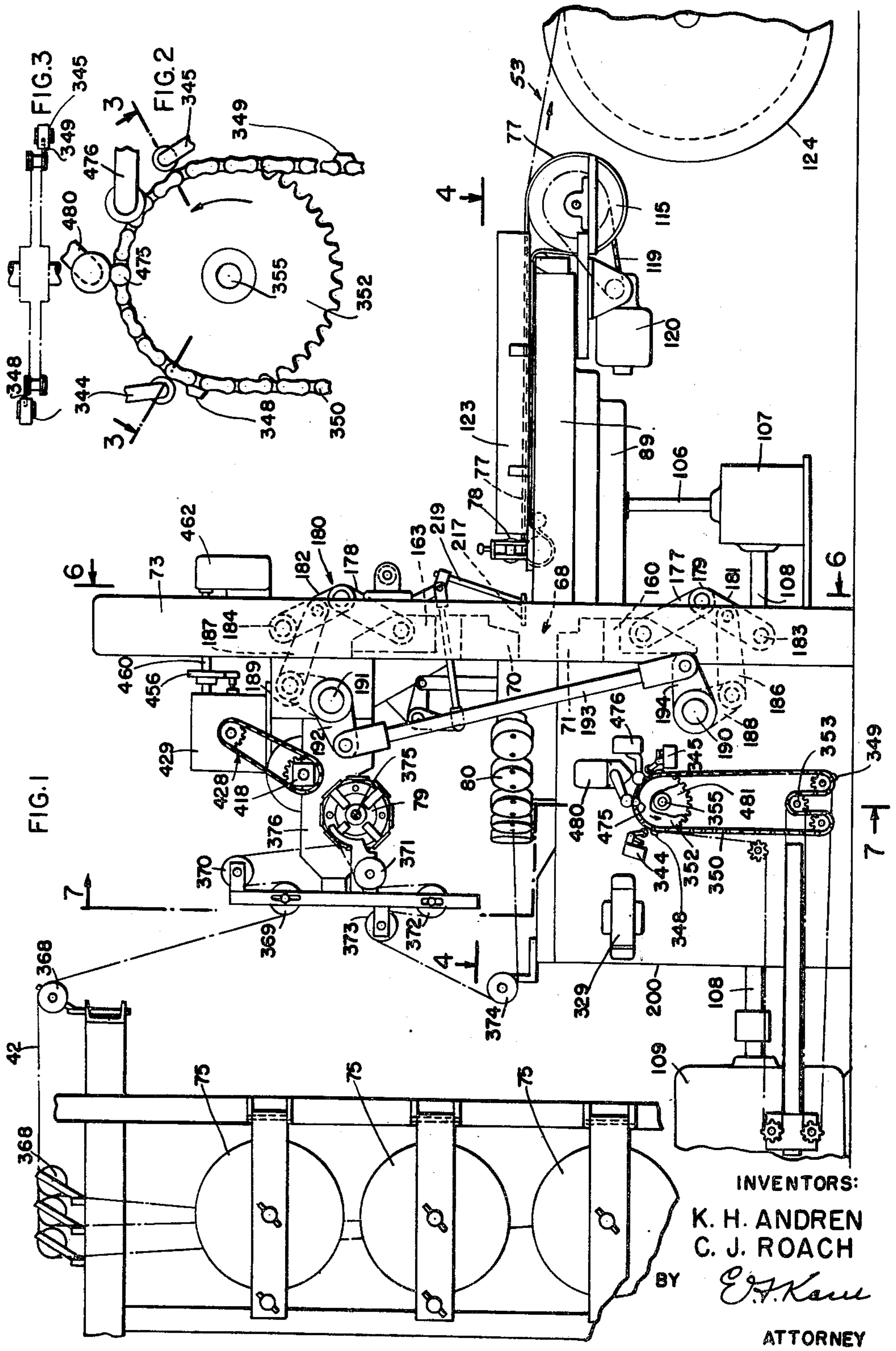
Figs. 2 and 3 are detailed elevational and diagrammatic sectional views respectively of a portion of a timing chain forming part of a control device.

The product assembled by the present apparatus is similar to the product disclosed in Patent 2,438,959 to L. A. Bartelheim and M. W. Lane on a method of assembling arcuate terminal banks and comprises a plurality of cards 40 having a plurality of pairs of connector terminals 41 thereon which are attached to a plurality of wires 42 arranged in pairs at spaced points thereon. The cards 40 are composite structures and each comprises a flat lower arcuate strip 43 of insulating material having a plurality of the terminals 41 mounted on the upper face thereof in an arc, and a similarly shaped upper strip 44 of insulation having a plurality of arcuately arranged terminals 41 attached to the lower face thereof and aligned with the lower terminals and separated therefrom by an intermediate arcuate strip 45 of insulating material. End portions of the pairs of superposed terminals extend outwardly beyond the convex edge of the strips of insulation 43—45 in laterally spaced relation to each other and have sleeve forming portions 47 formed thereon adapted to engage and be wrapped or clinched around the wires 42 at intervals, and prongs 48 formed in the end portions of the terminals are adapted to pierce the outer sheath of insulation on the wires 42 and engage the central metallic wire core thereof to establish an electrical connection between the conductor wires and the terminals. Each of the strips of insulation 43—45 is provided with a plurality of pilot apertures 50 and a plurality of apertures 51 for receiving clamping bolts therein when the cards are assembled into banks and two of which apertures are also used for aligning the component parts of the cards 40 on card holders of a feed table. The cards 40 are attached to the wires 42 in equally spaced relation to each other in groups of a predetermined number of cards to form a ladder 53 and successive groups of cards or ladders 53 are separated from and connected to each other by relatively long lengths 54 of wire which serve as leads from the ladders when they are assembled into banks and which are grouped together into a cable.

The wires interconnecting successive cards are twisted a predetermined number of turns preferably six, about each other, the pairs of wires being twisted in opposite directions alternately between successive pairs of cards. The twists imparted to the wire are grouped adjacent the connections to the terminals and provide an intermediate straight portion between the twisted end portions thereof. Thus in one type of ladder capable of being made by this machine and as shown diagrammatically in Fig. 33 each pair of wires is twisted six turns in one direction between each pair of adjacent cards and the direction of twist of the wires is reversed alternately after successive cards. In this type of ladder the wires of each pair of wires are connected to the corresponding terminals on each of the cards in the ladder.

Figures 33, 34, 35:
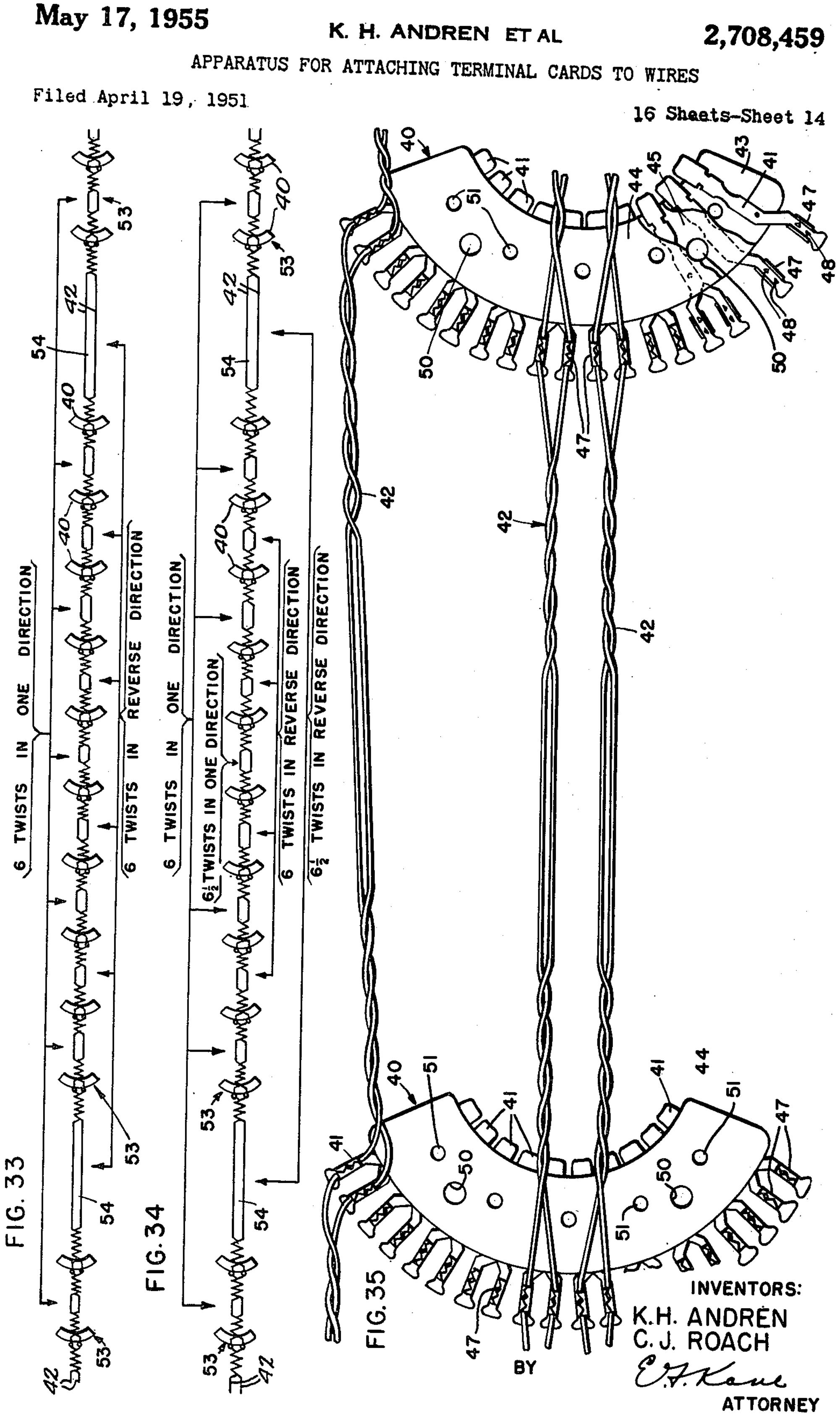
Fig. 33 is a diagrammatic view of one type of ladder capable of being assembled by this apparatus.
Fig. 34 is a view similar to Fig. 33 illustrating another type of ladder capable of being made with this apparatus.
Fig. 35 is a view of a portion of the product showing a pair of cards and a plurality of pairs of twisted wires interconnecting corresponding terminals on the cards with parts omitted for purposes of clearness.

The present apparatus is also capable of making a string of interconnected ladders as shown in Fig. 34 in which the relationship of the attachment of each pair of wires to the terminals of the cards is reversed for one half of the cards in each group or ladder with respect to the relationship of the attachment of the wires to the cards in the other half of each group or ladder. This is accomplished by either adding or subtracting one half a turn of twist to the normal six twists imparted to the wire between adjacent cards at selected intervals along the wires. Thus in the type of ladder indicated in Fig. 34 each group of five cards have the connections of the wires of each pair of wires to corresponding terminals on successive cards reversed with respect to the connections of the wires to the terminals of adjacent groups of five cards.

Figure 4:
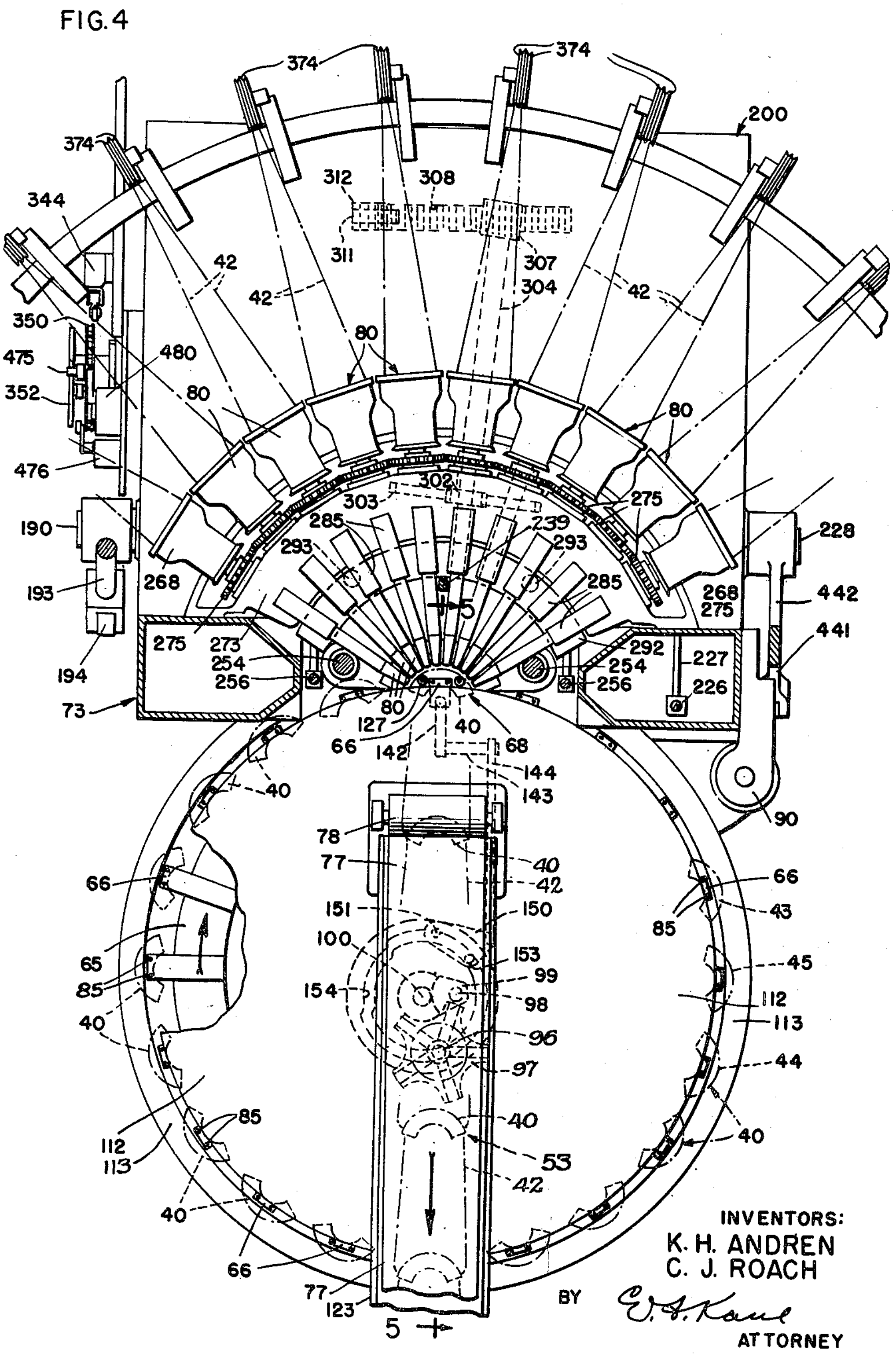
Fig. 4 is a plan sectional view of the apparatus taken on the line 4—4 of Fig. 1.

The apparatus for attaching the cards 40 successively to the wires 42 at spaced points thereon comprises generally an intermittently rotatable feed table 65 (Fig. 4) having a plurality of holders 66 for receiving and supporting the cards 40 thereon and feeding the cards to a clinching station 68, between a punch 70 and a die 71 (Fig. 5) mounted for reciprocable movement in a vertical frame 73 for clinching the terminals on successive cards to the wires 42 which are guided for movement through the clinching station 68 and above and in alignment with the terminals on the card 40 in the clinching station. The wires 42 are fed from a plurality of supply reels 75 behind the clinching station (Fig. 1) by a feeding mechanism including a movable feed belt 77 (Fig. 5) mounted in front of the clinching station and above the feed table 65 and cooperating with a roller 78 for yieldably engaging the wires 42 and cards 40 of the string of ladders to exert a pull thereon tending to advance the wires 42 through the clinching station. The feeding mechanism also includes a plurality of capstans 79 behind the clinching station which are intermittently rotated to release or unwind successive portions of the wire and permit the wires to be advanced corresponding distances through rotatable wire twisting elements 80 (Fig. 4) which twist each pair of the wires 42 about themselves as the wires are advanced from the clinching station.

The holders 66 have flat surfaces thereon for supporting the cards 40 and have a pair of spaced tapered pins 85 engageable in a pair of the apertures 51 of the card to locate the card in a predetermined position on the holder and in the clinching station 68. The table 65 is in the form of an annular member having an irregular cross section and a ring portion 87 which is receivable in an annular guideway or bearing recess 88 in a composite supporting frame 89 for rotatably supporting the table. The frame 89 is secured to the vertical frame member 73 and has a hinged connection 90 thereto (Fig. 4) to permit the frame member 89 to be separated from the frame 73 and thereby render a portion of the mechanism supported in the frame 73 accessible. The ring 87 is provided with gear teeth 94 forming an internal gear which meshes with a pinion gear 95 rotatably supported on a shaft 96 fixed to another portion of the frame member 89. Also supported for rotation on the shaft 96 and fixed to the gear 95 is a geneva wheel 97 which is intermittently engaged and actuated by a roller 98 of a geneva actuating arm 99 fixed to a shaft 100. The shaft 100 is rotatably supported in bearings formed in the frame 89 and has a gear 104 fixed to one end thereof which meshes with a gear 105 fixed to the upper end of a shaft 106. Shaft 106 is likewise rotatably supported in bearings formed in the frame member 89 and is connected through gearing in a speed reducing gear box 107 (Fig. 1) to a drive shaft 108 driven by a main drive motor 109.

A circular plate 112 is supported on a portion of the frame 89 to form a stationary table or platform with the edge thereof in spaced relation to an arcuate plate 113 and cooperates with the plate 113 to form an annular space or guideway for the movement of the holders 66. The annular plate 113 is mounted on the frame member 89 substantially in horizontal alignment with the platform 112.

A drive roller 115 (Figs. 1 and 5), a tail roller 116 and idler rollers 117 and 118 for the conveyor belt 77 are supported by suitable brackets attached to the frame member 89 and the drive roller 115 is driven through a sprocket and chain connection 119 from a motor 120 also supported from the frame 89. The upper course of the belt 77 is supported in a guideway formed by a channel shaped guide plate 123 which in turn is supported by suitable brackets on the plate 112. The string of interconnected ladders conveyed by the belt 77 may be wound upon a take-up reel 124 (Fig. 1) driven by any suitable means.

Figure 16:
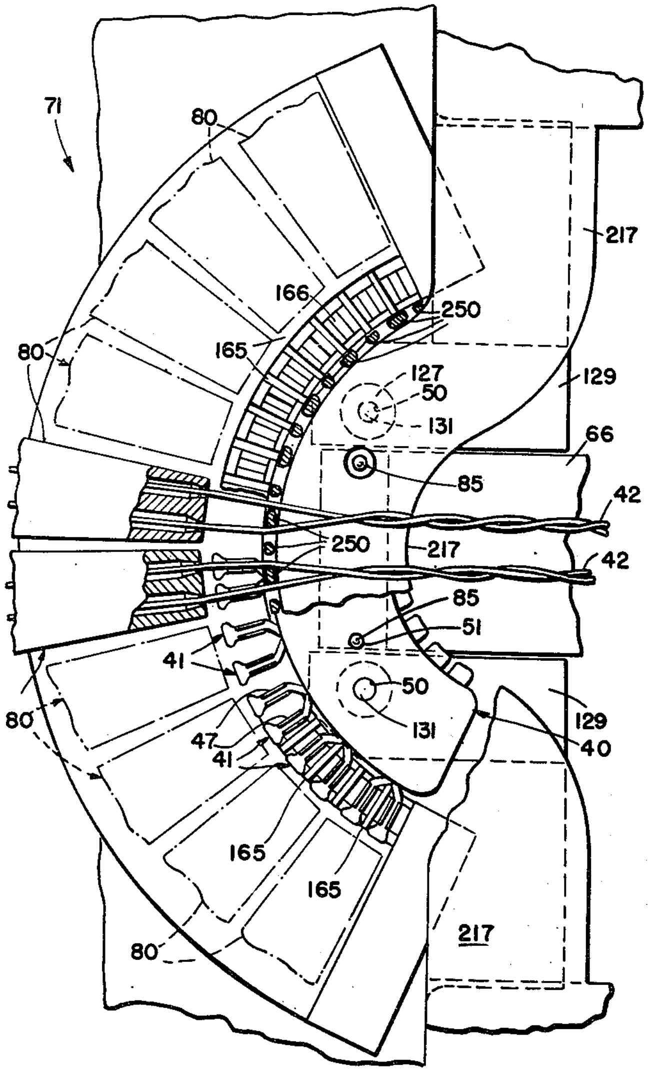
Fig. 16 is a fragmentary plan sectional view showing the lower die and a portion of a card positioned thereon and the twister elements in their retracted positions supporting a portion of the pairs of twisted wires in alignment with the terminals on the card.

The component parts 43—45 of the cards 40 are successively applied to the holders 66 of the feed table manually or otherwise at loading stations disposed around the feed table and are fed to the clinching station where the assembled composite cards are transferred from the holder 66 onto a holder 126 (Figs. 5, 12 and 16) forming an elevator or transfer member which is moved upwardly to remove the cards from the holder 66 and carry them into close proximity to the wires 42. The holders 126 comprise a pair of rods 127 slidably mounted in apertures 128 in members 129 which are mounted on a die supporting block or shoe 130 for vertical movement with the die. The rods 127 have reduced upper end portions 131 forming pilot pins for fitting into the apertures 50 of the cards 40 and have shoulders 132 for supporting the cards thereon. As indicated in Fig. 16 the card holder 66 is relatively narrow and is adapted to be positioned in the clinching station between the spaced supporting members 129 and the rods 127 of the holder 126. At their lower ends the rods 127 are connected together by a bar 133 for vertical movement as a unit and springs 134 engaging shoulders on the rods 127 urge the rods upwardly to their normal upper position relative to the members 129 (Fig. 12) in which position the portions 131 of the holder 126 are disposed below the path of movement of the cards 40 on the feed table.

At a predetermined point in the cycle of operation of the machine after the cards 40 have been attached to the wires 42 and as the die 71 is descending, the holder 126 is adapted to be moved downwardly relative to the die to rapidly disengage the pilot pins 131 thereof from the card to permit the indexing of the feed table and the feeding of another card to the clinching station. The rapid retraction or downward movement of the rods 127 is accomplished by the engagement of the bar 133 of the holder 126 by a laterally extending arm 138 of a plunger 139 (Figs. 5 and 14) mounted for reciprocable movement in a guide bracket 140 fixed to the frame member 89. The rod 139 is connected at its lower end to a link 141 which is pivotally connected to an arm 142 fixed to a rock shaft 143 supported on the frame 89. A second arm 144 also fixed to the shaft 143 is connected by a link 145 to a rod 146 mounted for horizontal movement in a guide aperture 147 in the frame member 89. At its opposite end the rod 146 is pivotally connected to another link 148 which is pivotally attached to a cam lever 150 fixed to a pivot pin or shaft 151 supported in a bearing 152 on the frame 89. The cam lever 150 has a roller 153 riding in a cam groove 154 of a cam 155 fixed to the shaft 100. Thus as the cam 155 is rotated movement is imparted thereby through the lever 150 and the linkage to the plunger 139 to cause the arm 138 thereof to engage and rapidly depress the card elevator or holder 126 at a predetermined point in the cycle of operation.

Figure 5:
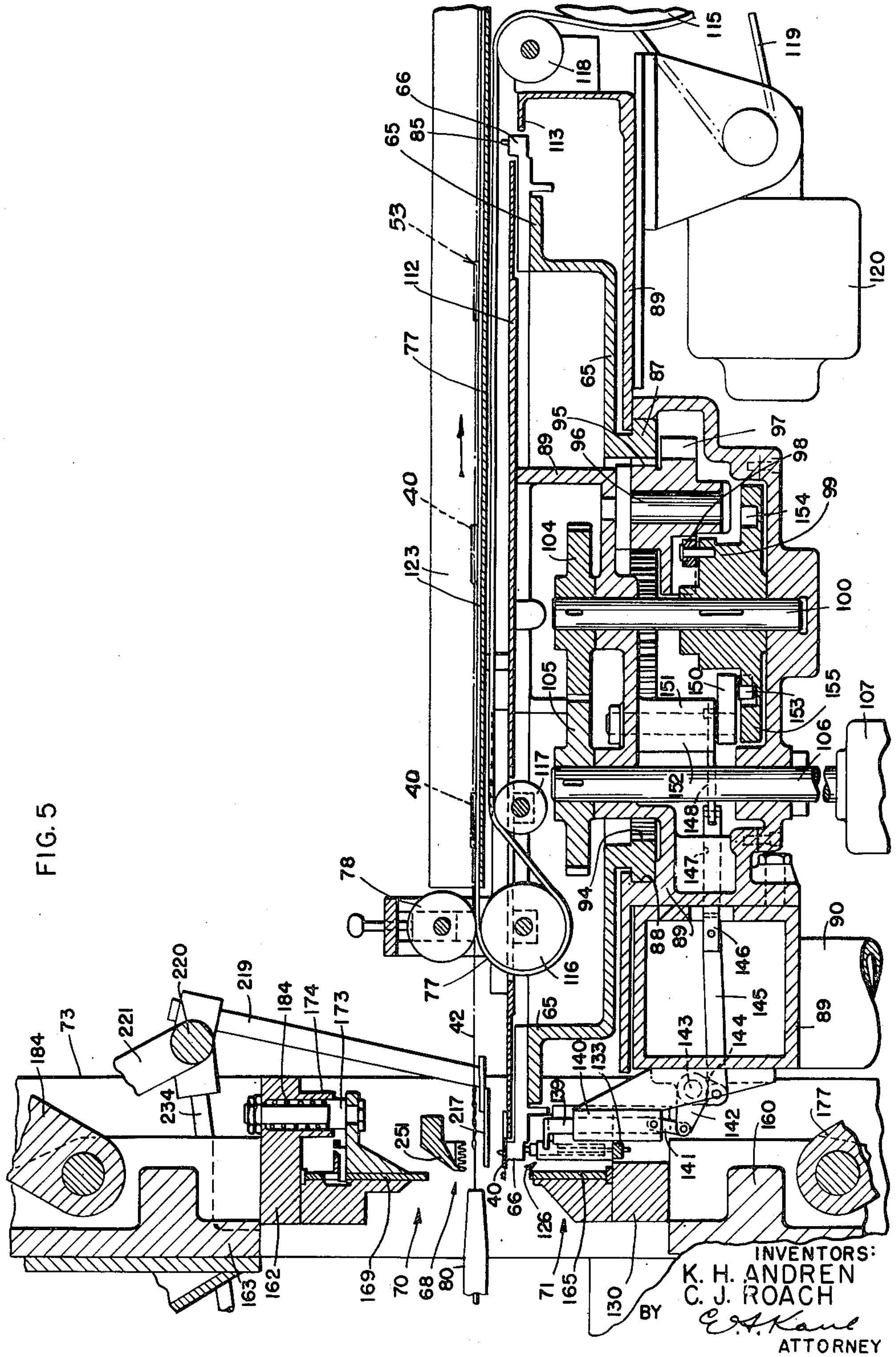
Fig. 5 is a vertical longitudinal sectional view through a portion of the machine showing the card feeding table and the punch and die taken on the line 5—5 of Fig. 4.
Figure 8:
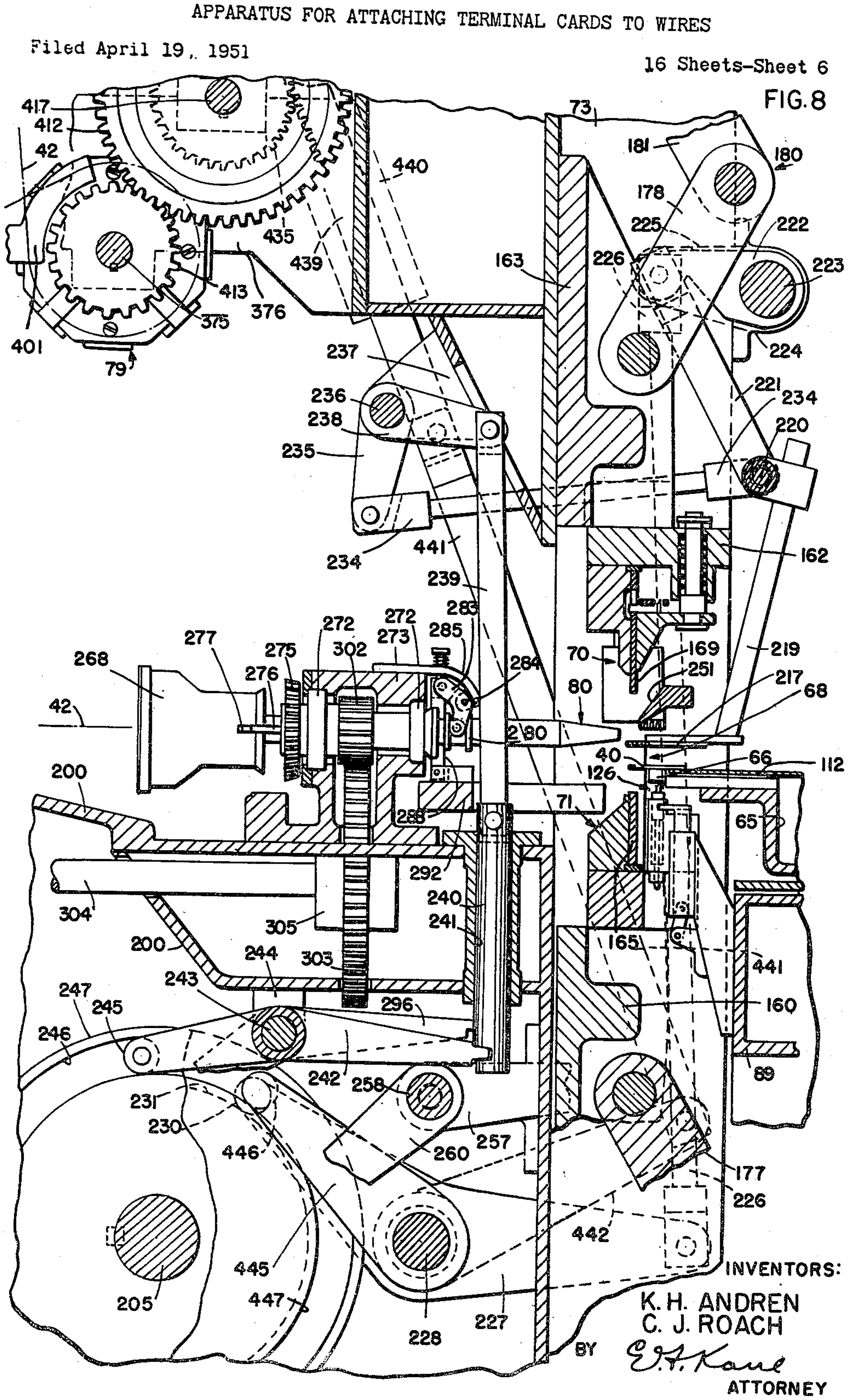
Fig. 8 is a vertical longitudinal sectional view through a portion of the machine taken on the line 8—8 of Fig. 6 showing the punch and die in open position and portions of some of the mechanism associated therewith and with parts broken away and other parts omitted for sake of clearness.
Figure 13:
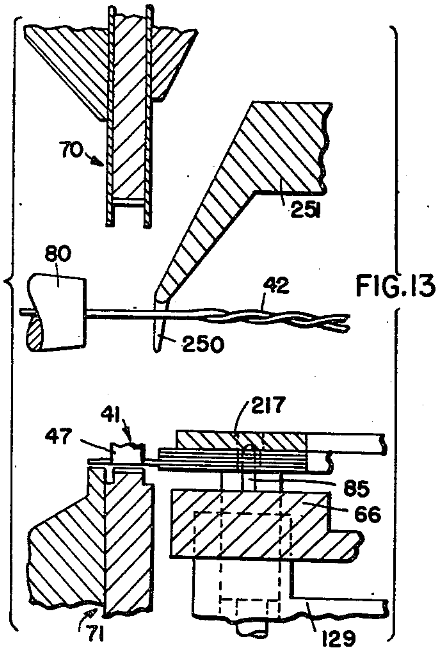
Fig. 13 is a view similar to Fig. 12 showing the parts in a different position.
Figure 14:
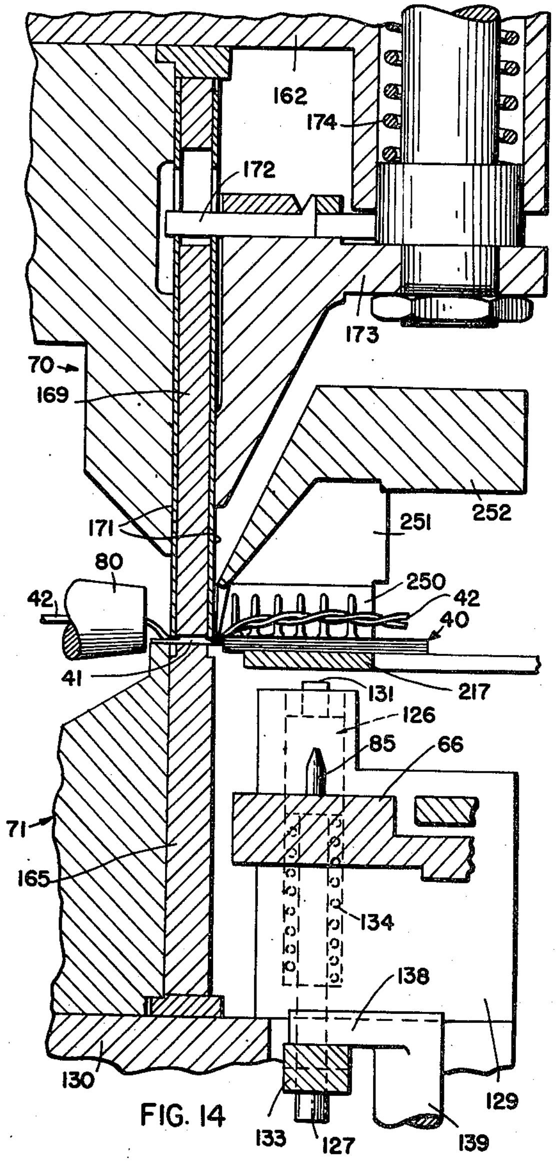
Fig. 14 is a view similar to Figs. 12 and 13 showing the parts thereof in a position they assume when the dies are in their closed position clinching a terminal about a wire.
Figure 17:
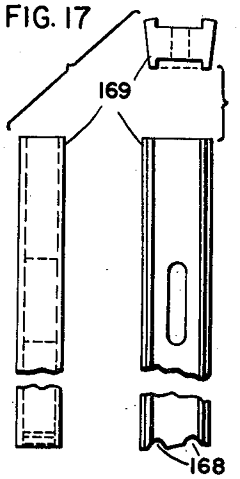
Fig. 17 is a group of side, front, and top views of a punch element.
Figure 18:
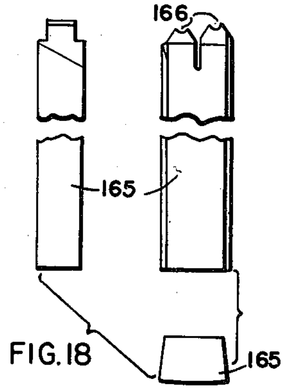
Fig. 18 is a group of side, front, and end views of a lower die element.
Figure 19:
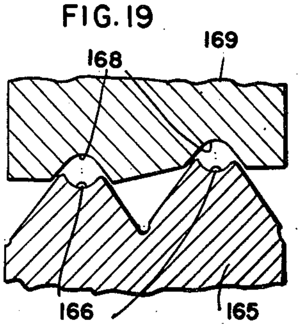
Fig. 19 is an enlarged fragmentary vertical cross sectional view through the end portion of a punch and die element in closed position.

The die 71 is supported on the die block or shoe 130 which in turn is secured to a lower ram 160 mounted for vertical movement in guideways on the vertical frame 73 and the punch 70 is supported on a punch holder 162 which is secured to an upper ram 163 mounted for vertical movement in the guideways on the vertical frame member 73 (Figs. 1, 5 and 8). The die 71 comprises a plurality of die elements 165 (Fig. 18) supported in nested and arcuate relation on the die shoe 130 (Figs. 5, 14 and 16). Each of the die elements has a pair of grooves or supporting surfaces 166 in the upper end thereof. The surfaces 166 of the die elements 165 are adapted to cooperate with forming surfaces or grooves 168 in the lower end of punch elements 169 of the punch 70 for engaging the sleeve portions of the terminal 41 and clinching or wrapping them about a pair of the wires 42. The punch elements 169 (Figs. 17 and 19) are carried by the shoe or block 162 (Fig. 5) and are nested in an arcuate arrangement above and in alignment with the die elements 165 (Fig. 16). Each of the punch elements is provided with a pair of stripper plates 171 (Figs. 12, 13 and 14) slidably mounted in guideways in the punch elements and stressed for movement downwardly in advance of the punch element 169 by fingers 172 mounted on a plunger element 173 for vertical movement in the block 162 and urged downwardly by a spring 174. The ends of the stripper plates 171 have V-shaped notches engageable with the wires 42 as the punches descend to centralize the wires relative to the sleeve forming portions 47 of the terminals 41.

Figure 11:
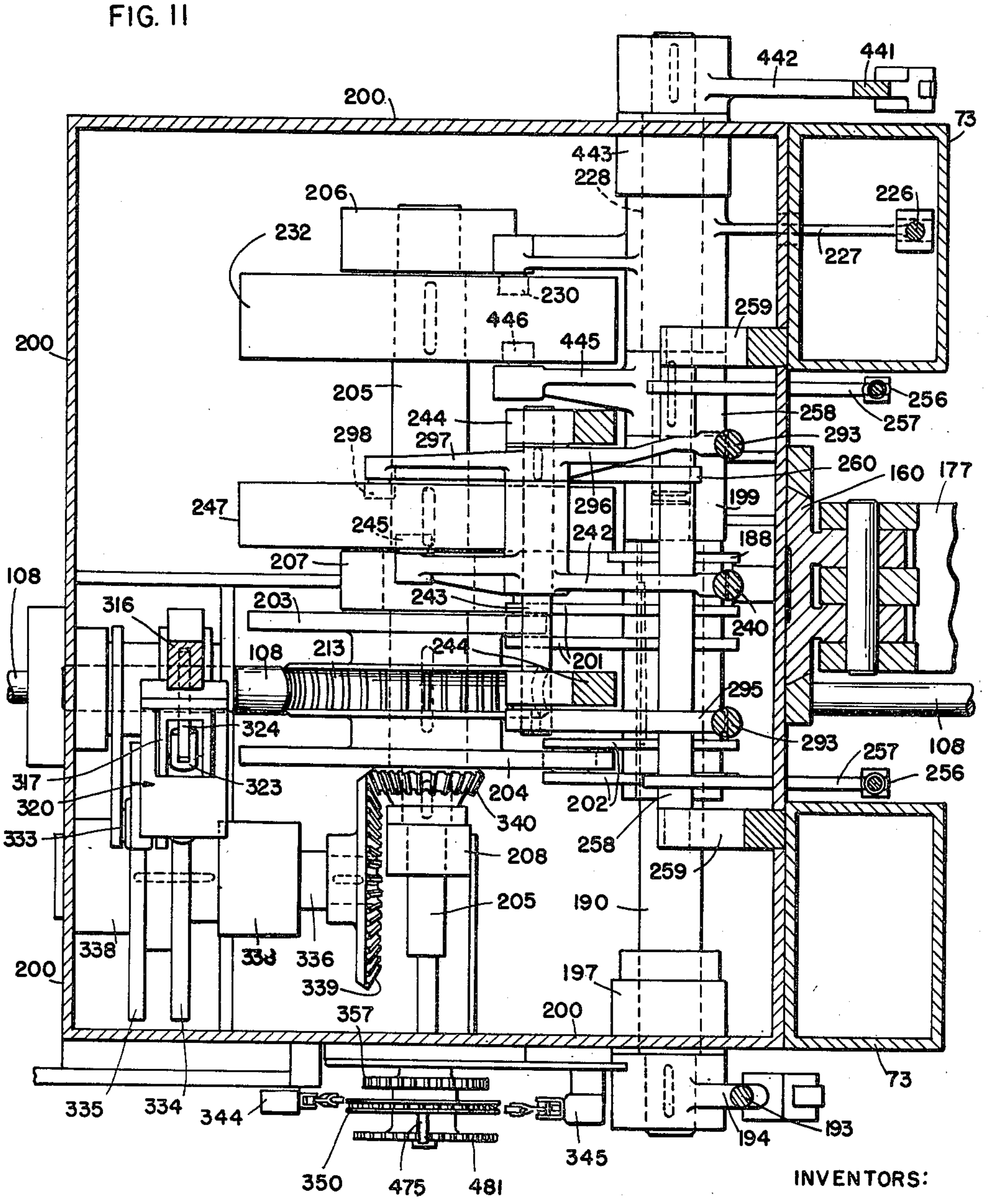
Fig. 11 is a plan sectional view taken on the line 11—11 of Fig. 9 showing the main cam shaft and actuating mechanism associated therewith.

The upper and lower rams 160 and 163 (Fig. 1) are connected to links 177 and 178, respectively, of toggles 179 and 180 the other links 181 and 182 of which are pivotally connected for rocking movement about fixed fulcrums 183 and 184 on the vertical frame member 73. Links 186 and 187, having one end thereof connected to the toggle links 181 and 182, respectively, intermediate their ends, are connected at their other ends to levers 188 and 189 fixed to shafts 190 and 191. The shaft 191 is supported in brackets extending rearwardly from the frame member 73 and has fixed thereto at one end a lever 192 which is connected to one end of a link 193 the other end of which is pivotally connected to an arm 194 fixed to the shaft 190. By means of this linkage the rams 160 and 163 and the punch and die carried thereby are interconnected for simultaneous movement in opposite directions. One end portion of the shaft 190 (Fig. 11) is mounted for oscillation in a bearing 197 and the other end portion is reduced and is supported in a bearing 199 which bearings are supported on or formed integral with a frame member 200 secured to the rear side of the vertical frame 73 and forming a box-like housing enclosing a portion of the actuating mechanism of the apparatus. The arm 194, as indicated in Fig. 11, is mounted on one end of the shaft 190 on the outside of the housing 200 and the arm 188 is mounted on the other end of the shaft 190 substantially along the center line of the machine. A pair of cam levers 201 and 202 (Figs. 9 and 11) are keyed to the shaft 190 and have cam followers engageable with the periphery of a pair of conjugated cams 203 and 204 fixed to a cam shaft 205 which is supported for rotation in bearings 206, 207 and 208 supported on the base 210 of the housing 200. A worm gear wheel 213 fixed to the shaft 205 meshes with a worm gear 214 (Figs. 7 and 9) keyed to the motor drive shaft 108. Thus in response to the rotation of the cam shaft 205 the toggle actuating mechanism is positively actuated in a predetermined and controlled rate of movement to actuate the punch and die through successive cycles of operation.

Figure 6:
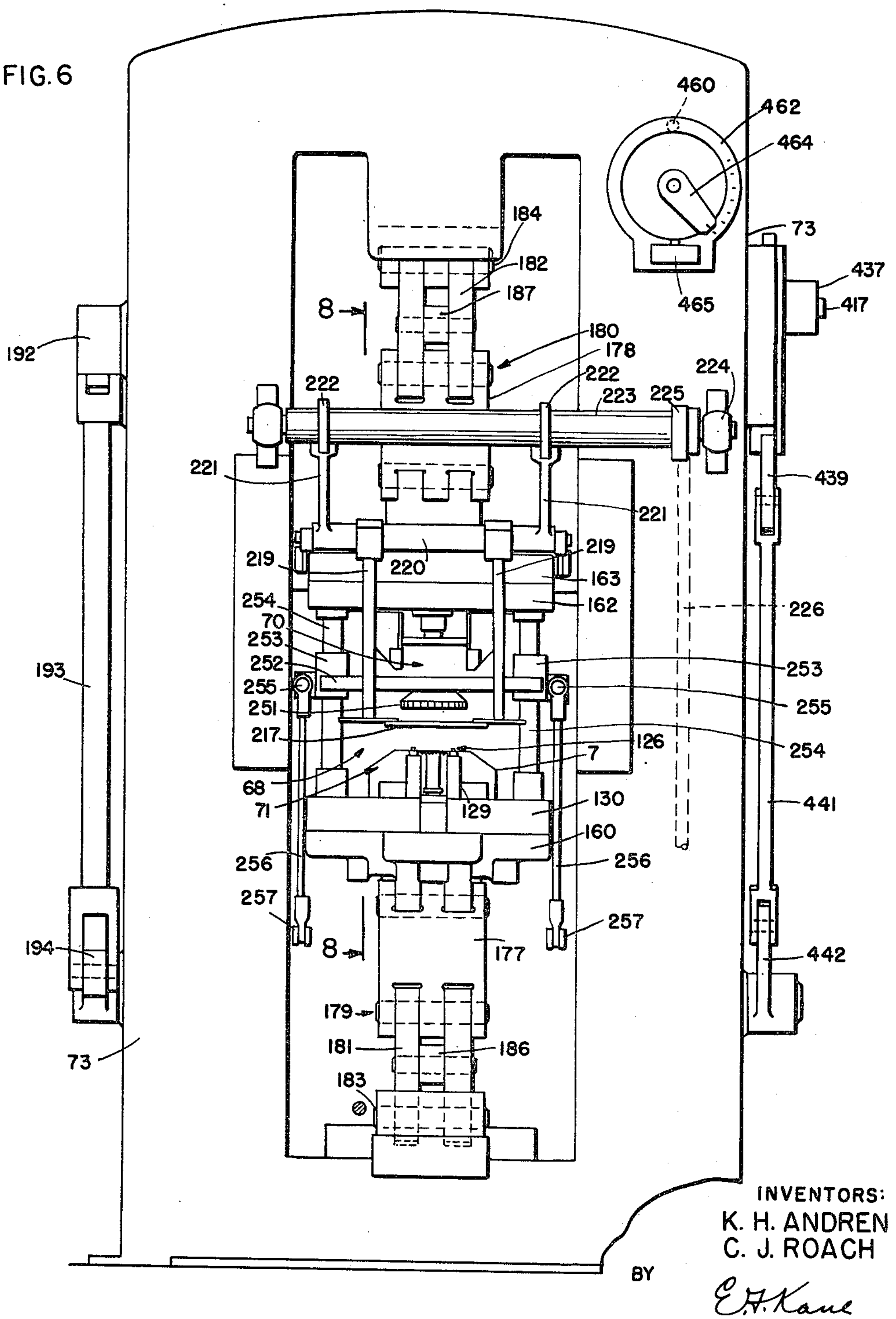
Fig. 6 is a vertical cross sectional elevational view taken on the line 6—6 of Fig. 1 and showing a front elevational view of the punch and die and associated mechanism.

As the cards 40 are transferred at the clinching station 68 from the horizontally movable card holders 66 onto the vertically movable card holder 126 for movement upwardly with the holder 126 into engagement with the wires 42 a hold down and stripper member 217 (Fig. 13) is moved into engagement with the upper surface of the card to press the card firmly onto the pilot ends 131 of the rods 127 and cooperate therewith to hold the card thereon during the upward movement of the holder 126. The hold down member 217 comprises a horizontally disposed strip or bar which is curved at its central portion to conform roughly to the shape of the cards 40 and has straight end portions which are secured to the lower ends of rods 219 (Fig. 8) which at their upper ends are attached to a movable rod 220. The rod 220 is fixed to the lower ends of links 221 which at their upper ends are pivotally connected to one end of a pair of levers 222 which at their other ends are fixed to a shaft 223 supported for rocking movement in bearing brackets 224 on the vertical frame member 73. A lever 225 fixed to the shaft 223 is pivotally connected to one end of a rod or link 226 (Figs. 6, 8 and 11), which at its lower end is connected to one end of a bell crank cam lever 227 freely mounted for rotation on a shaft 228. The other end of the bell crank 227 carries a cam follower 230 which rides in a cam groove 231 in a cam 232 fixed to the cam shaft 205 for rotation therewith whereby in response to rotation of the cam 232 vertical movement is imparted to the member 217.

Also pivotally connected to the rod 220 are the ends of a pair of links 234 which are connected at their opposite ends to a pair of arms 235 fixed to a shaft 236 supported in suitable bearing brackets 237 mounted on the rear of the vertical frame member 73. Intermediate the arms 235, the shaft 236 has a lever 238 fixed thereto which is pivotally connected to a link 239 which in turn is pivotally connected at its lower end to a rod 240 slidably mounted for vertical movement in a guideway 241 on a portion of the housing frame member 200. At its lower end the rod 240 has a slot for receiving one end of a lever 242 supported for pivotal movement on a shaft 243 mounted in a bearing bracket 244 supported from a portion of the housing 200. Attached to the opposite end of the lever 242 is a cam follower 245 which rides in a cam groove 246 of a cam 247 keyed to the shaft 205 for imparting horizontal movement to the member 217.

Figure 15:
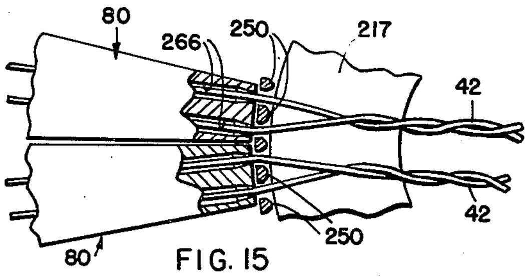
Fig. 15 is a fragmentary plan view of two of the twister elements shown in their advanced position and a comb engaged between the twisted wires.

The hold down stripper member 217 is thus raised and lowered by the linkage connected thereto under control of the cam 231 and the cam lever 227 and is moved horizontally, backward and forward, through the linkage connected thereto under control of the cam 246 and the cam lever 242. In addition to pressing the cards 40 onto the pilot pins 131 of the vertically movable holder or transfer members 126 (Fig. 13) the hold down member 217 is adapted to be moved upwardly with the holder 126 and the card 40 thereon and at a certain elevation the member 217 is moved rapidly to the right as viewed in Fig. 13 then downwardly and underneath the card 40 to engage the lower surface thereof as indicated in Fig. 14 and support the card while the holder 126 is retracted to withdraw the pilot pins 131 from the apertures 50 of the cards 40. The hold down and stripper element 217 at one portion of the cycle of operation is moved into engagement with the under side of the wires 42 to support them as the teeth 250 of a comb member 251 move into engagement with the wires (Figs. 12, 15 and 16) to separate the wires and aid in positioning them in alignment with the terminals on a card in the clinching station and with the punch and die elements.

Figure 12:
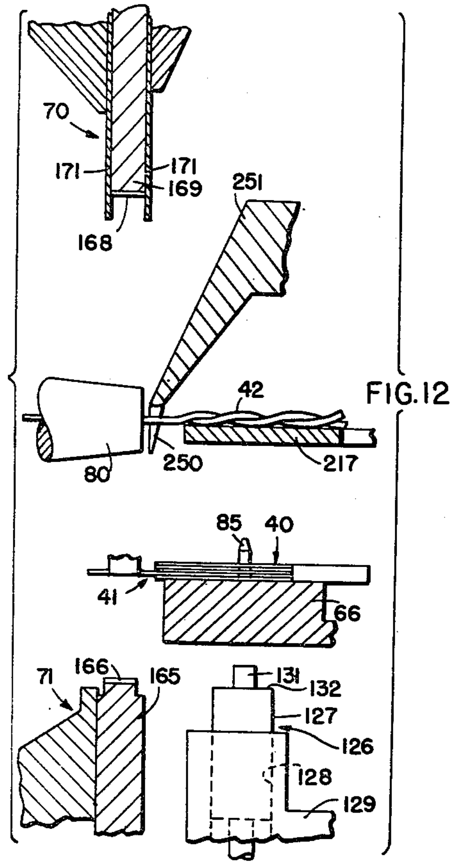
Fig. 12 is a fragmentary vertical sectional view of a portion of the machine showing the elements for supporting and acting on the cards and the wires in one position of the cycle of operation and with the clinching dies fully open.

The comb 251 is secured to a bar 252 which has formed on the ends thereof guide collars 253 (Fig. 6) slidably mounted on guide rods or aligning pins 254 of the punch and die. Pivotally connected at 255 to lugs on the guide collars 253 are the upper ends of a pair of links 256 which at their lower ends (Figs. 6, 9 and 11) are connected to levers 257. Levers 257 are fixed to a shaft 258 (Figs. 7, 9 and 11) which is supported in bearing brackets 259 mounted on the frame 200. A cam lever 260 fixed to the shaft 258 has a cam follower 261 riding in a cam groove 262 of the cam 247 which serves to actuate the linkage and raise and lower the comb 251 in predetermined timed relation to the actuation of the other elements of the apparatus. The teeth 250 of the comb are arranged in an arc and are adapted to be moved between the wires of each pair of wires in the twisting elements 80 and between the wires of adjacent pairs of wires at a point between the twisted portions of the wire and the twisting elements 80 when the elements 80 are in their advanced position as shown in Fig. 12 for the purpose of spacing the wires arcuately and in cooperation with the twisting elements 80 for supporting portions of the wires in alignment with the sleeve forming portions 47 of the terminals on the card 40 when the twister elements have been retracted to the position shown in Fig. 13.

Figure 29:
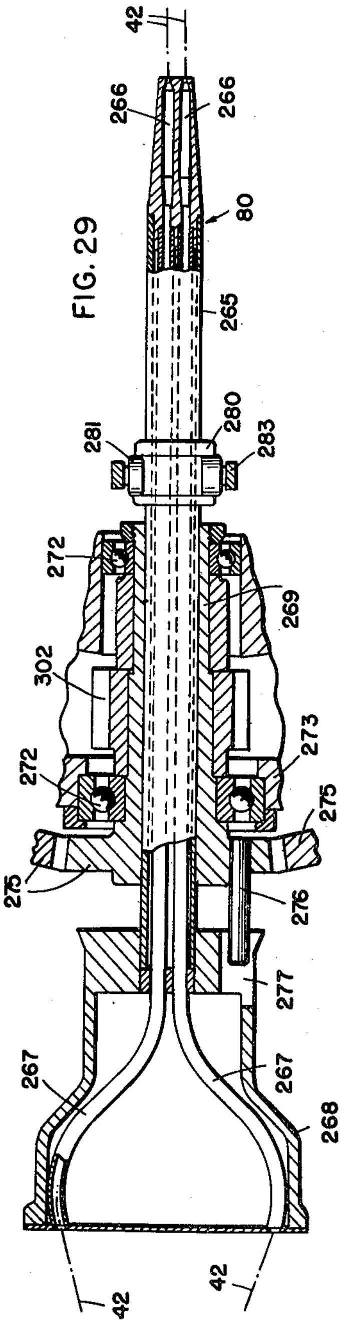
Fig. 29 is a horizontal longitudinal sectional view through one of the wire twisting elements.

The twister elements 80 (Figs. 4, 8, 9, 12, 13, 15, 16 and 29) which are rotatable and axially movable are arranged in an arc and are directed radially toward the clinching station 68 for guiding pairs of wires toward the clinching station and for twisting each pair of wires about each other as previously stated. Each of the twister members 80 (Fig. 29) comprises a tubular member 265 having two wire guideways 266 formed therein, portions of which guideways comprise guide tubes 267—267 which at their rear end portions are curved outwardly (Fig. 29) and are housed within a bell shaped housing 268 secured to the end of the tubular member 265. The tubular members 265 are mounted for axial movement in sleeves or hollow shafts 269 which are journaled for rotation in bearings 272 in an arcuate supporting bracket 273 mounted on the upper wall portion of the housing 200. The sleeves 269 have gears 275 secured to one end thereof which gears mesh with each other and connect all of the twisting elements 80 for simultaneous and equal rotation. Pins 276 (Fig. 29) fixed to the gears 275 extend axially therefrom into engagement with recesses or notches 277 in the bell housing 268 to connect the sleeve 269 and the tubular member 265 for rotation together while permitting relative axial movement between them.

Figures 9, 10:
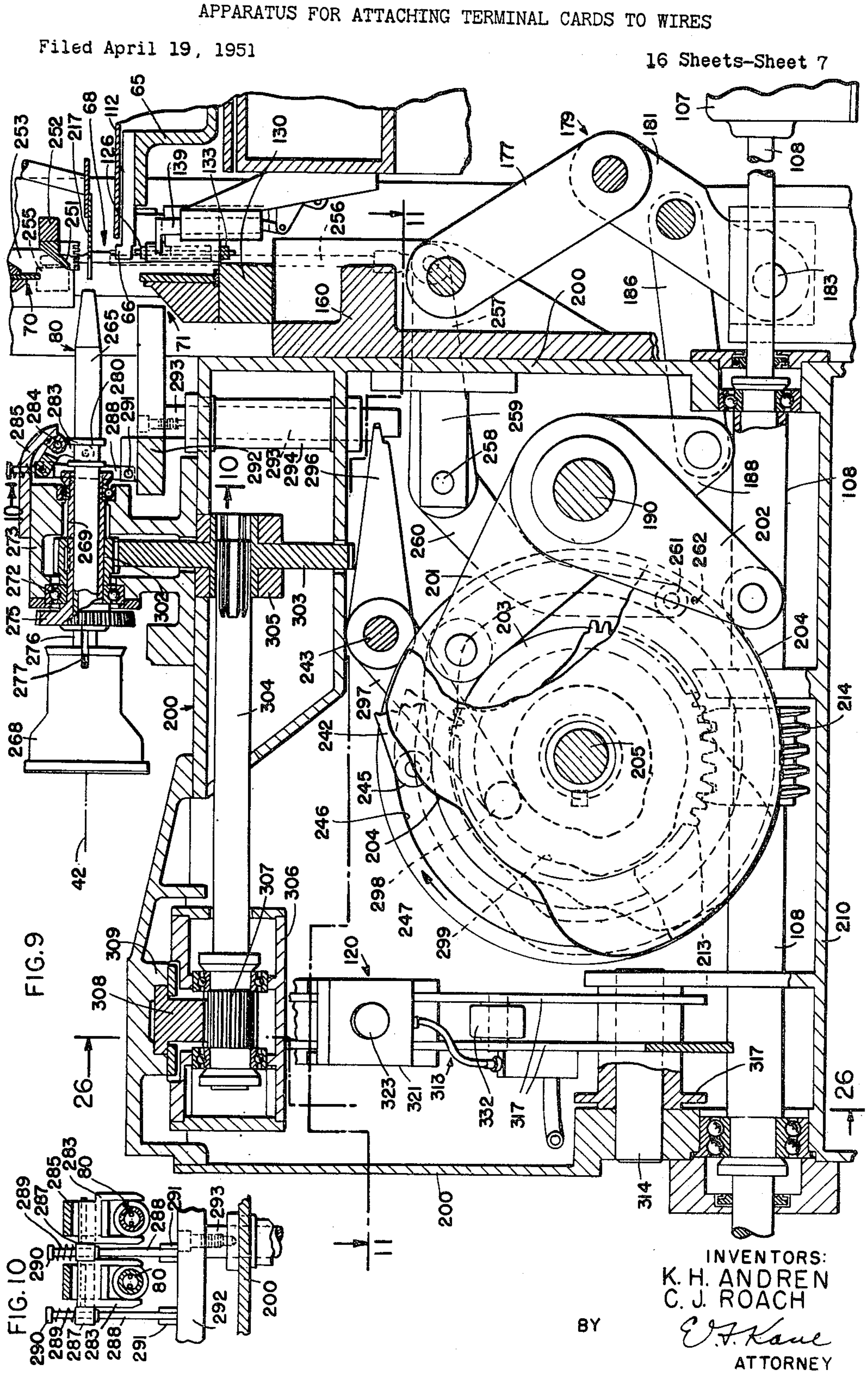
Fig. 9 is a vertical longitudinal sectional view through a portion of the machine taken on the line 9—9 of Fig. 7 and showing the twister elements for twisting the pairs of wires and some of the drive mechanism of the apparatus.
Fig. 10 is a detail sectional view taken on the line 10—10 of Fig. 9 showing a portion of the mechanism for imparting axial movement to the twister elements.

The twister elements are reciprocated axially to and from the advanced and retracted positions shown in Figs. 12, 15 and Figs. 13, 16, respectively, by mechanism comprising shifting collars 280 (Figs. 8, 9 and 29) fixed to the tubular members 265 and engaged by rollers 281 mounted on the bifurcated ends of bell crank levers 283 which are in turn pivotally mounted at 284 on brackets 285 fixed to and extending forwardly from the supporting bracket 273. The other ends of the bell crank levers are pivotally connected to blocks 287 (Fig. 10) through apertures in which reduced ends of rods 288 are slidably mounted. Springs 289 interposed between collars 290 on the upper ends of rods and the blocks 287 urge the blocks 287 into engagement with the shoulders on the rods 288 which at their lower ends are pivotally connected to lugs 291 on an arcuate actuating bar 292. The bar 292 is fixed to the upper portion of a pair of rods 293 which are slidable in tubular guide members 294 mounted in the upper portion of the frame member 200 (Fig. 9). The lower ends of the guide rods 293 are slotted to receive the ends of a pair of levers 295 and 296 keyed to the shaft 243. The lever 296 is in the form of a bell crank and has a cam lever 297 on which is mounted a cam follower 298 which rides in cam grooves 299 of the cam 247 which in turn serves to oscillate the levers 295 and 296, and raise and lower the actuating bar 292 to cause the horizontal movement of the twister elements 80 to and from their forward and rearward positions shown in Figs. 12, 15 and Figs. 13, 16, respectively.

Figures 26, 27, 28:
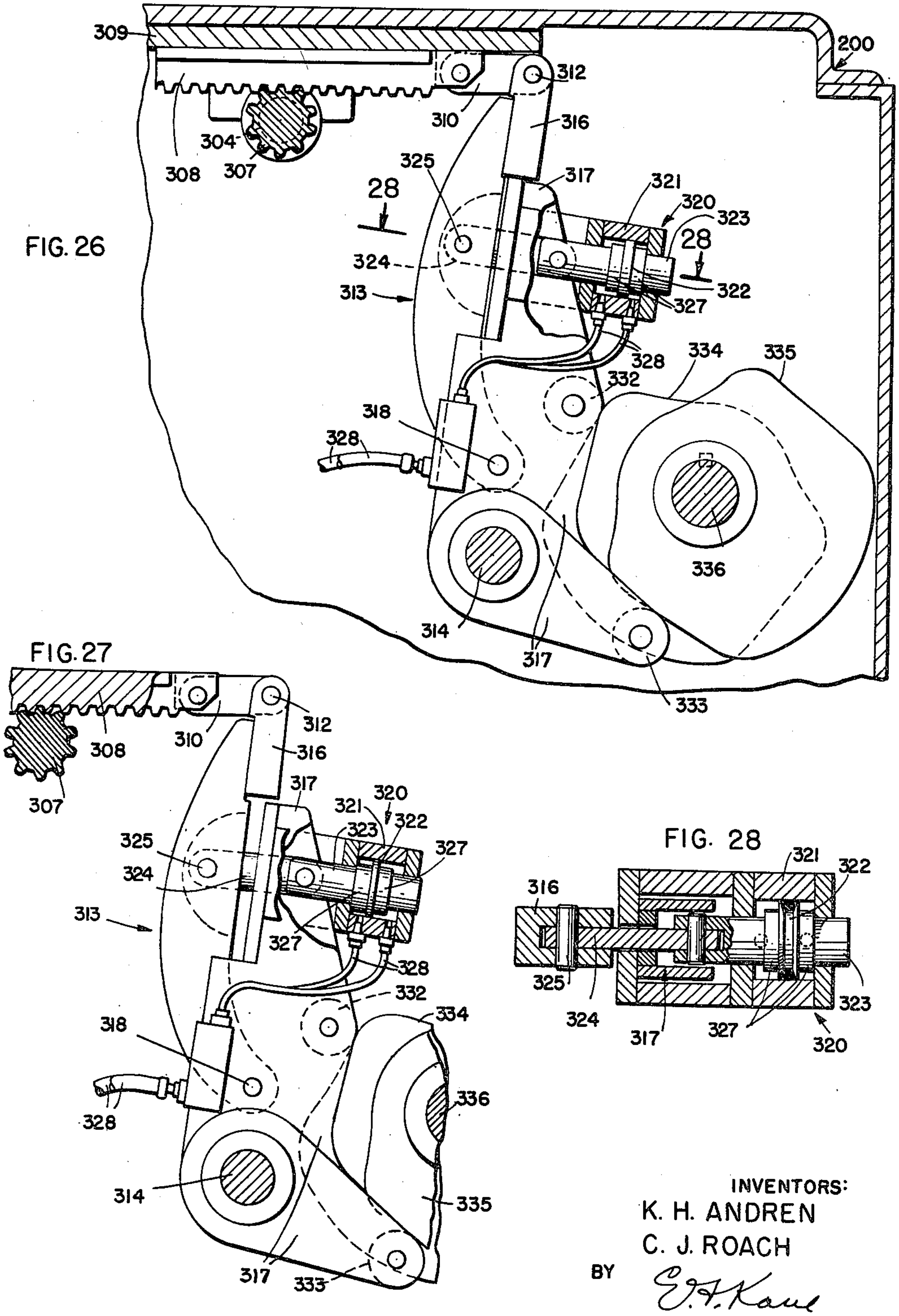
Fig. 26 is a fragmentary vertical sectional view taken on the line 26—26 of Fig. 9 showing a portion of the drive for rotating the wire twisting elements.
Fig. 27 is a view similar to Fig. 26 showing the parts in change position.
Fig. 28 is a cross sectional view taken on the line 28—28 of Fig. 26.
Figures 30, 31, 32:
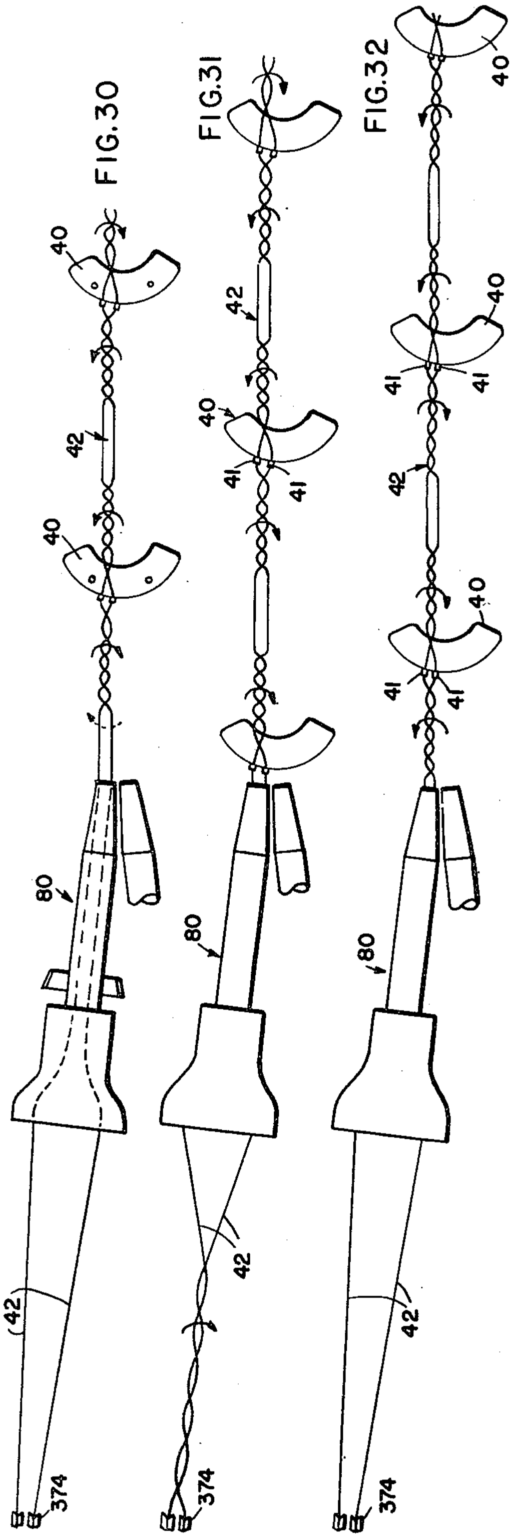
Figs. 30, 31 and 32 are diagrammatic views illustrating a wire twisting element and a pair of wires twisted thereby in three stages of a cycle of operation.

Mechanism is provided for rotating the twister elements a predetermined number of revolutions, preferably six, alternately in opposite directions and to add one half revolution of movement in opposite directions to the twister elements at selected intervals. To the sleeve 269 of one of the centrally located twisting elements 80 is fixed a gear 302 (Figs. 8, 9 and 29), which meshes with a gear 303 on a shaft 304 mounted in bearing brackets 305 and 306 (Fig. 9) fixed to the upper portion of the housing 200. At its rear end the shaft 304 has a gear 307 secured thereto which meshes with a rack 308 slidably mounted in a slideway 309 formed in the upper portion of the housing 200. The rack 308 (Fig. 26) is connected at one end to a link 310 which in turn is pivotally connected at 312 to one end of a composite bell crank lever 313 mounted for oscillatable movement about a pivot shaft 314 suitably supported in the housing 200. The composite lever 313 comprises an arm 316 and an arm 317 pivotally connected together at 318.

The arm 316 and the upper end of the arm 317 are connected together by an adjustable connector device 320 which comprises a cylinder 321 secured to the arm 317 and having a piston 322 therein, the rod 323 of which extends through apertures in the ends of the cylinder. One end of the piston rod 323 is connected to one end of a link 324 the other end of which fits in a slot in the arm 316 and is pivotally connected to the arm by a pin 325. The arm 316 is adapted to be moved from one position shown in Fig. 26 to a second position shown in Fig. 27, the movement of the arm 316 relative to the arm 317 being limited by shoulder portions 327 of the piston which shoulder portions are engageable with the ends of the cylinder 321. Oil or other fluid is admitted to opposite ends of the cylinder 321 through a pair of pipe lines 328 to actuate the piston 322 in opposite directions and to lock the piston and the arm 316 in either one of its two positions.

The arm 317 is formed in part by a plurality of parallel plates between two of which is mounted a cam follower 332 and between another pair of which is mounted a cam follower 333 which followers are adapted to engage the peripheries of a pair of conjugated cams 334 and 335 fixed to a shaft 336. Shaft 336 is supported in a pair of bearings 338—338 mounted on or formed as part of the housing 200 and has a beveled gear 339 fixed to one end thereof which meshes with a beveled gear 340 on the main cam shaft 205 (Fig. 11). The shaft 336 and the cams 334 and 335 are rotated one revolution for each two revolutions of the shaft 205 and impart a complete reciprocation to the rack bar 308. Thus for each revolution of the main cam shaft 205 and each cycle of operation of the apparatus the rack 308 is moved through one stroke in one direction only to impart a predetermined number, as for example six, of complete revolutions to the twisting elements 80 to twist each pair of wires therein about themselves six complete turns in one direction. During the following cycle of operation as the wires are advanced the rack bar 308 is caused to move through one complete stroke in the opposite direction and effect the twisting of each pair of wires through six complete turns in the reverse direction. The twisting of the wires 42 occurs as the wires are advanced through the machine. The movement of the rack 308 in each direction is not continuous but is interrupted by dwell portions on the cams during which the wires are advanced in a straight line without any twisting being imparted thereto. Thus each pair of wires extending between adjacent cards on a ladder is normally twisted through six complete turns, the twists thereof being disposed adjacent the terminals on the cards and three of the twists being separated from the other three twists by the intermediate straight portions of the wires.

Idler guide pulleys 374 (Figs. 1 and 4), which guide the wires 42 into the twisting elements 80, are spaced a relatively long distance from the twisting elements to permit the pairs of wires 42 extending rearwardly of the twisting elements 80 to be twisted three turns in one direction and then unwound and twisted three turns in the opposite direction without interfering with the free travel of the wire through the twister elements as the elements are rotated to twist the pairs of wires passing therethrough.

With the arms 316 and 317 of the composite bell crank 313 locked in one position the apparatus functions to impart six complete twists to each pair of wires between successive cards of the ladder formed by the apparatus. This type of ladder as indicated in Fig. 33 has the same wires of each pair of wires connected to corresponding terminals on successive cards of the ladder. When it is desired to form a string of ladders of the type shown in Fig. 34 where the position of the wires of each pair of wires on one half of the cards in each ladder are connected to corresponding terminals on said one half of the cards in one position and are reversed with respect to the corresponding terminals on the other half of the cards in the ladder the connector device 320 is actuated at predetermined intervals of five cards, alternately, to and from its first and second positions shown in Figs. 26 and 27, respectively.

Control mechanism is provided for selectively actuating the connector device 320 and moving the arm 316 to and from its first and second positions and locking it in either of these positions. The control mechanism includes the solenoid actuated valve 329 (Fig. 1) which has a pair of solenoids 342 and 343 (Fig. 37) connected to a source of power in series with normally open switches 344 and 345 respectively. The solenoid valve 329 is of the type which is actuated to one position by the momentary energization of one of the solenoids and remains in this position until the other solenoid is energized to move it to the other position. The switches 344 and 345 are mounted on the side of the housing 200 in the path of travel of cam lugs 348 and 349, respectively, mounted on opposite sides of a timing chain 350 (Figs. 1 and 2). The chain 350 is entrained around a driving sprocket 352 and a plurality of idler sprockets 353. The sprockets 352 (Fig. 7), is rotatable about a shaft 355 suitably supported in a bearing bracket mounted on the side of the housing 200 and is fixed to a gear 357 for rotation therewith, the gear 357 meshing with a drive pinion 358 secured to the reduced end portion of the cam shaft 205.

When the apparatus is set up to fabricate the type of ladders shown in Fig. 34 the cam lugs 348 and 349 are positioned on the timing chain 350 to cause the shifting of the arm 316 and the rack 308 from one position to another relative to the arm 317 to occur during the movement of the rack 308 in the same direction as the direction of the movement of shifting and serves to increase the stroke or movement of the rack during such shifting movements and cause the rack to rotate the twister elements 80 six and a half revolutions and twist the wires six and a half turns instead of the normal six turns and results in the shifting or reversal of the relationship of the wires in each pair of wires to the corresponding terminals on cards preceding and following this shifting movement. Subsequent oscillation of the composite lever 313 with the arm 316 shifted to its second position relative to the arm 317 will impart the normal six revolutions of turning movement to the twisting elements 80.

The cam lugs 348 and 349 and the timing chain 350 may be set up in the machine to cause the shifting of the arm 316 and the rack 308 from one position to another relative to the arm 317 to occur during the movement of the rack in the opposite direction from the regular direction of movement of the shifting of the rack and this procedure will serve to decrease the stroke or movement of the rack during such shifting movements to cause the rack to rotate the twister elements five and a half revolutions and twist the wires five and a half turns instead of the normal six turns. This also will have the effect of shifting or reversing the relationship of the wires in each pair of wires to the corresponding terminals on cards preceding and following the shifting movements. Timing chains of various lengths and with various arrangements of cam lugs are used in the apparatus for fabricating various types of ladders. In some types of ladders the cams 348 and 349 and timing chain 350 are set up to cause the shifting of the arm 316 and the rack 308 relative to the arm 317 to and from their two operative positions to occur during the movement of the rack in the same direction. In such instances the direction of shifting movement is alternately in the same direction as and in the opposite direction to the movement of the rack and serves alternately to add and subtract one half turn of twist to the pairs of wires between the cards where the reversal takes place.

The wires 42 which are advanced measured amounts by the intermittent rotation of the capstans 79 are withdrawn from the supply reels 75 and guided over pulleys 368, 369 and 370 and directed tangentially onto and around the capstans 79 and guided tangentially from the capstans around pulleys 371, 372, 373 and 374 into the ends of the wire twister elements 80.

The capstans 79 (Figs 20 to 25) are in the form of disks or wheels 378 keyed to a drive shaft 375 which is mounted for rotation in supporting brackets 376 extending rearwardly from the vertical frame 73. Each of the capstan wheels has formed thereon a pair of cylindrical surfaces or shoulders 379 forming drums separated from each other by a central peripheral rib 380 having vertical walls 381. A pair of wires 42 is adapted to engage and be partially wrapped around the drum portions 379 of the capstan and be moved against the walls 381 by a plurality of axially movable jaws 383 mounted on opposite sides of the capstan. The movable jaws 383 comprise rectangular plates 384 mounted in slots 385 in the shoulder portions 379 and have shanks or rods 386 extending axially therefrom, the heads 387 of which are slidably mounted in guide apertures 388 in the wheel 378. Springs 389 interposed between the heads 387 and plates 390 secured to the wheel stress the jaws 383 to a normal closed position shown in Fig. 22 in engagement with the plates 390.

Figures 20, 21, 22, 23, 24, 25:
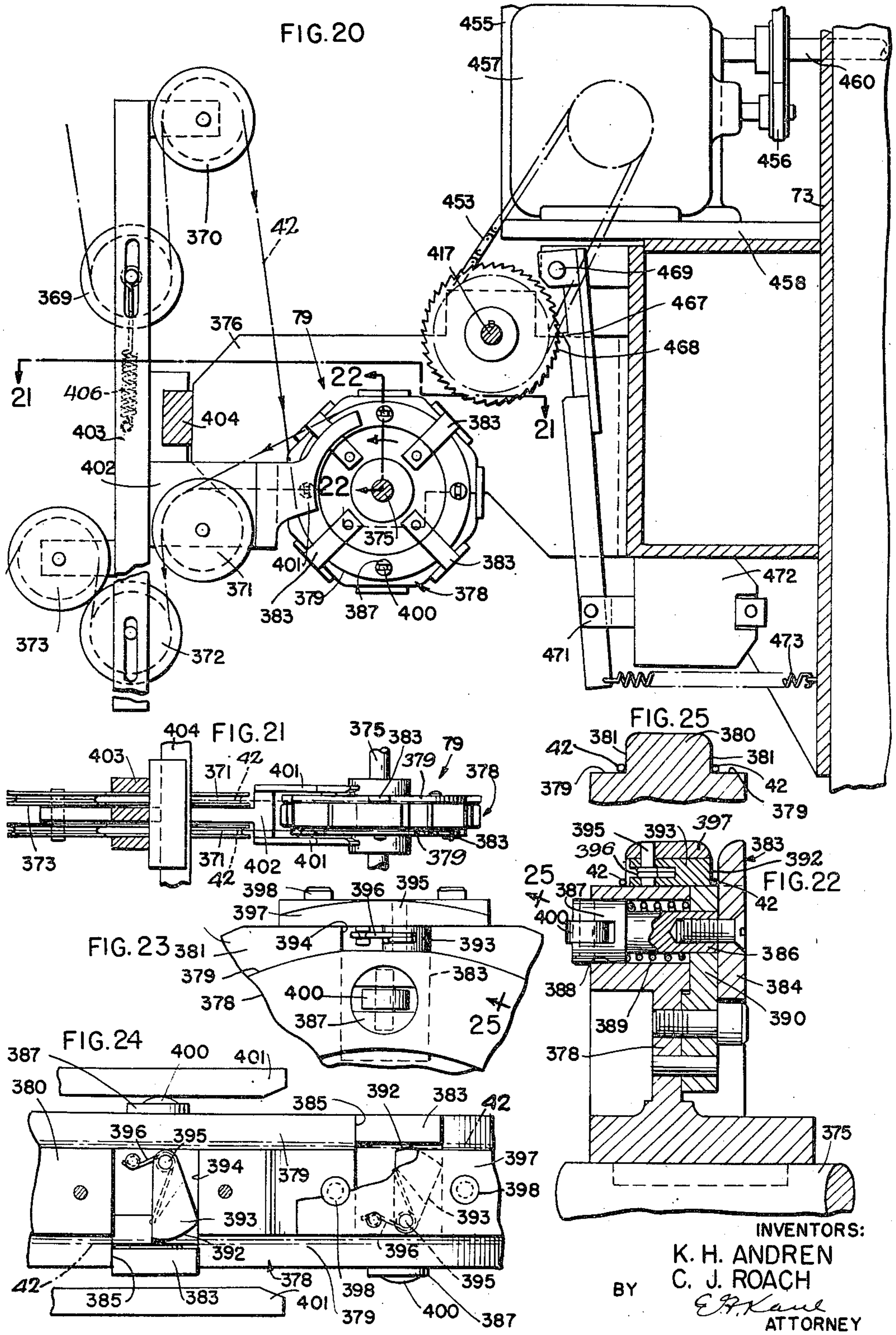
Fig. 20 is a fragmentary vertical sectional view taken on the line 20—20 of Fig. 7 showing a portion of the wire guide and feed mechanism.
Fig. 21 is a fragmentary plan view taken in the line 21—21 of Fig. 20 showing one of the capstans of the drive mechanisms.
Fig. 22 is an enlarged fragmentary vertical sectional view through the capstan taken on the line 22—22 of Fig. 20.
Fig. 23 is a side elevational view of a portion of the capstan.
Fig. 24 is a fragmentary plan or developed edge view of a portion of the capstan shown in relation to the stationary cams for actuating the movable clamping jaws thereon.
Fig. 25 is a detail cross sectional view of a portion of the capstan taken on the line 25—25 of Fig. 23.

In the closed position the jaws 383 grip the wires 42 against the curved surfaces 392 of jaw members 393 mounted for pivotal movement about pins 395 and in slots 394 which extend transversely across the rib portion 380 of the wheel. Springs 396 urge the jaw members 393 for movement about the pins 395 to a normal position in engagement with one wall of the slots 394 as shown in Fig. 24, and caps or plates 397 secured to the capstans by screws 398 overlie the slots 394 and retain the jaws 393 and pins 395 in position. In response to forward or counter clockwise rotation of the capstans 79 as viewed in Fig. 20 the wires 42 are adapted to be gripped between the movable jaws 383 in their normal closed position and the end of the jaws 393 and advanced therewith. In response to the rotation of the capstans in a reverse or clockwise direction the jaw members 393 are adapted to grip the wires 42 against the movable jaws 383 and cause the wires to be moved therewith until the wires are drawn taut and offer sufficient resistance to overcome the tension of the spring 396 and cause the jaw members 393 to rock about the pivot pins 395 and release the wires. The curvature of the surfaces 392 of the jaw members 393 are eccentric relative to the pins 395 and are such that as the jaws 393 are moved with the capstans in a reverse direction they will be moved about the pins 395 by a rearward drag of the wires and will disengage themselves from and release the wires.

The four sets of movable jaws 383 on opposite sides of the capstans and the cooperating oscillatable jaws 393 which are disposed equi-annularly about the capstan wheel 378 (Figs. 20, 21 and 24) are adapted to grip pairs of wires 42 during a major portion of the revolution of the capstans. The movable jaws 383 which are yieldably maintained in their normal closed positions to grippingly engage the wires for movement with the capstan are moved to open position to release the wire in that zone where the wires are directed onto and from the drum portions 379 of the capstan by the engagement of rollers 400 on the ends of the rods 386 of the movable jaws with stationary arcuately shaped cam plates 401 disposed at opposite sides of the capstan wheels 378. The arcuate cam plates 401 are mounted on brackets 402 which are secured to vertical support bars 403 which in turn are attached to a horizontal support or bar 404 (Figs 7 and 20) secured to the ends of the supporting brackets 376. The bars 403 also support the pulleys 369, 370, 371, 372 and 373. The pulleys 369 and 372 are mounted for limited vertical movement in slots in the bars and the former are yieldably urged downwardly by springs 406 to absorb the shocks to the wires 42 incident to the starting of the capstans.

As the capstans 79 intermittently unwind measured lengths of wires and the conveyor belt 77 and roller 78 apply tension to the wires 42 to advance the wires, it is essential that the tension be applied to the intermediate group of wires attached to the intermediate pairs of terminals on the cards which terminals are disposed centrally of the ladder and substantially parallel to the pull of the wires, and that no tension be applied to the wires connected to the several pairs of terminals on the ends of the card which are disposed at a substantial angle transversely of the pull of the wires to avoid any twisting or damage to the endmost pairs of terminals. Accordingly slightly longer measured lengths of wire are unwound by the capstans to the several pairs of the outer terminals and this is accomplished by providing the several outer capstans on each end of the capstan drive shaft 375 with drum portions 379 of slightly larger diameters. Any wire unwound by the capstans in excess of the lengths advanced by the intermittent advance of the finished portion of the ladder is accumulated between the guide rollers 371 and 373 by the action of the vertically movable rollers 372 which maintain the wires substantially taut between the capstans and the terminals on the last card of the ladder.

A reciprocatory cam actuated drive 407 (Fig. 7) is provided for rotating the capstans after each one of successive cards have been attached to the wires to successively unwind uniform lengths of the wires thereby to control the spacing of the cards 40 on the wires to predetermined regularly spaced intervals. An auxiliary drive feed 408 is provided for feeding the wires an additional distance at predetermined intervals of a predetermined number of cards to separate the cards into groups or ladders as stated before and to provide the relatively long lengths of wires between the ladders. A reverse drive mechanism 409 is provided to reversely rotate the capstans a relatively short distance at a point during the forming of each ladder to remove the slack accumulated in some of the wires.

The drives 407, 408 and 409 are operatively connected to the capstan drive shaft 375 through a differential gear drive 410 the rotatable housing 411 of which has fixed to it a ring gear 412 which meshes with a gear 413 keyed to the capstan shaft 375. The housing 411 has a pair of bearings 414 for rotatably receiving the end portions of shafts 417 and 418 which are supported for rotation in bearings 420 in brackets 376 and 422 fixed to the vertical main frame 73. To the inner ends of the shafts 417 and 418 are keyed beveled gears 424 and 425, respectively, which mesh with bevel gears 426 rotatably mounted in the housing 411 for rotation therewith about the axis of shafts 417 and 418. The shaft 418 is connected through a sprocket and chain connection 428 to a worm and worm wheel gear reducer 429 of the reverse drive 409 and which gear reducer 429 is driven through a belt and pulley connection 430 by a motor 431 supported on a platform 432 on the rear of the frame 73.

Figure 7:
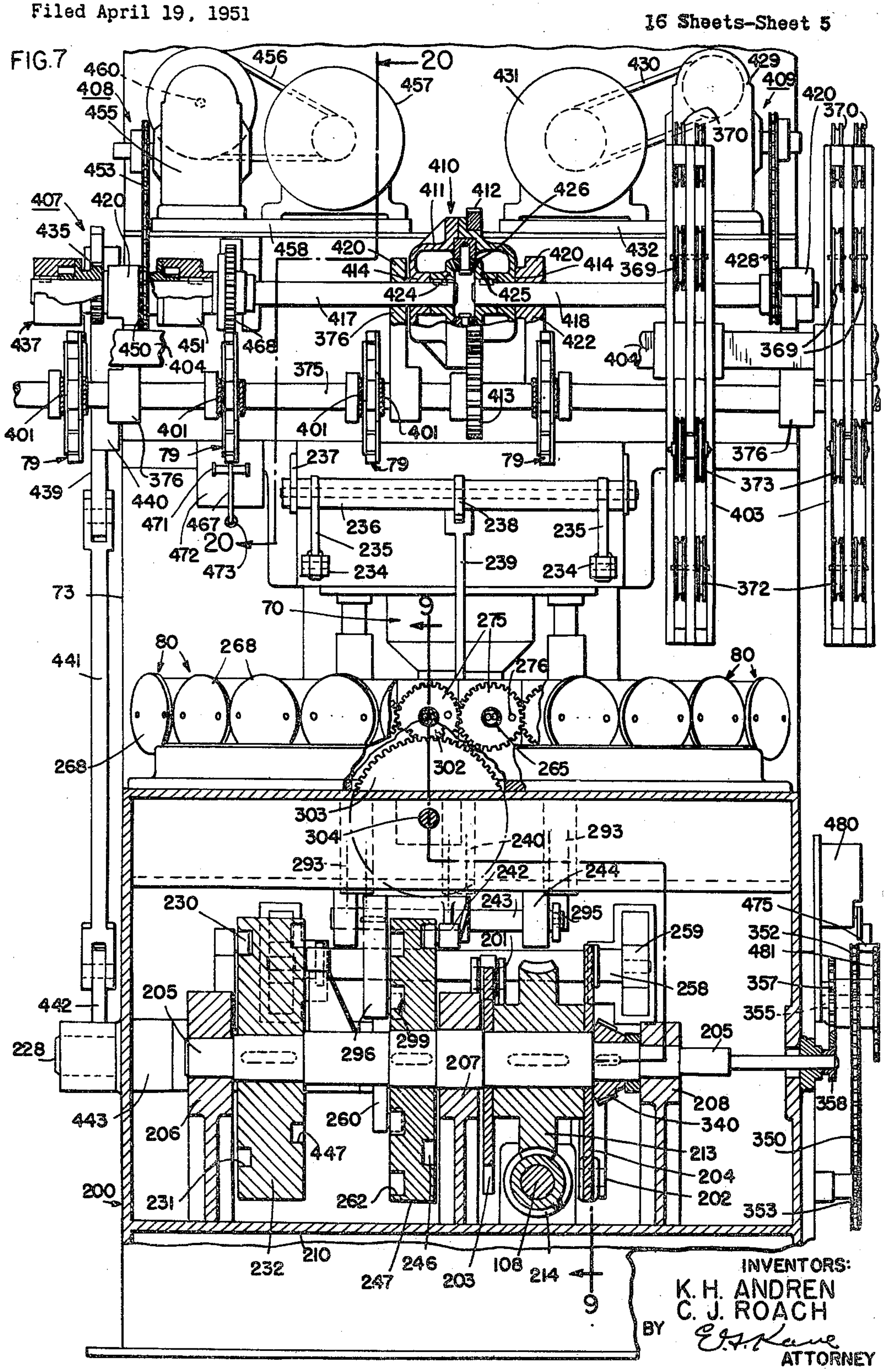
Fig. 7 is a vertical cross sectional elevational view of the apparatus looking from the rear and taken on the line 7—7 of Fig. 1.

The shaft 417 (Fig. 7) is connected to the reciprocatory drive 407 which comprises a gear 435 fixed to a driving element of a one way clutch 437, another element of which is keyed to the drive shaft 417. The one way clutch 437 permits free rotation of the gear 435 on the shaft 417 in one direction and affects a driving connection between the gear and the shaft when the gear is rotated in a forward direction. The gear 435 meshes with the teeth of a rack bar 439 slidably mounted in a guide bracket 440 fixed to the main frame 73 and a link 441 connects the rack bar 439 to one end of a lever 442. The lever 442 is keyed to one end of the shaft 228 which is journaled in bearings 443 and 199 (Fig. 11). Keyed to the shaft 228 in spaced relation to the arm 442 is a cam lever 445 which has a roller 446 riding in a cam groove 447 of the cam 232 (Fig. 7). Thus for every revolution of the cam 232 the rack bar 439 is caused to reciprocate and impart rotation to the capstan drive shaft 417 during the movement of the rack 439 in one direction.

The auxiliary drive 408 (Fig. 7) comprises a sprocket 450 connected to the shaft 417 through a one way clutch 451 which permits free rotation of the sprocket on the shaft in a reverse direction and effects a driving connection for rotating the shaft 417 in a forward direction. The sprocket 450 is connected through a chain and sprocket drive 453 to a worm and worm wheel gear reducer unit 455 which in turn is driven through a belt and pulley connection 456 from a motor 457. The motor 457 and gear reducing unit 455 are mounted on a platform 458 extending rearwardly from the main frame 73.

A shaft 460 (Fig. 20) extending forwardly from the gear reducer unit 455 is connected to a control unit or timing device 462 (Fig. 6) mounted on the front of the vertical frame 73 and which has an element 464 settable to selectively control the length of the lead wires 54 between adjacent ladders 53. The control device 462 may be any well known commercial counting device having a switch 465 actuatable to closed position in response to rotation of the shaft 460 and maintained in closed position until the required number of feet of wire has been fed at which time the switch 465 is actuated to open position by the element 464.

When either the cam actuated drive 407 or the motor driven auxiliary drive 408 is operative to impart rotation to the shaft 417 the reverse drive 409 is inoperative and serves to lock the shaft 418 against rotation. Thus as the shaft 417 is rotated it rotates the gear 424 which in turn will roll the gear 426 about the gear 425 and cause the housing 411 and the gear 412 to rotate and impart rotation to the capstan drive shaft 375. The one way clutches 437 and 451 permit actuation of the capstan drive shaft 375 by either the reciprocable drive 407 or the auxiliary drive 408. When the reverse drive 409 is operative to rotate the shaft 418 the shaft 417 is adapted to be held against rotation by a latch or locking pawl 467 (Fig. 20) moved into engagement with the teeth on a ratchet 468 keyed to the shaft 417. The latch 467 at its upper end is pivotally mounted at 469 and is connected at its lower end to the armature 471 of a solenoid 472 electrically connected into the motor circuit and energized to actuate the latch into engagement with the ratchet when the motor 431 is running. A spring 473 connected to the lower end of the latch yieldably maintains the latch in a normal position disengaged from the ratchet 468. Thus as the shaft 418 is rotated when the reverse drive 409 is operative it rotates the beveled gear 425 which in turn rolls the beveled gear 426 about the gear 424 and causes the housing 411 and the gear 412 to be rotated and impart rotation in a reverse direction to the capstan drive shaft 375 and the capstans thereon to take up the slack in the wires 42.

A pin 475 on the timing chain 350 actuates a switch 476 (Figs. 1, 2 and 37) to closed position for a short period of time to cause the motor 431 to rotate the capstans 79 through approximately one-eighth of a revolution in a reverse direction to remove the slack in the wires at a time in the cycle of operation when the last card of a ladder is being momentarily held between the punch and die as the terminals 41 are being clinched onto the wires 42. On completion of the formation of a ladder 53 the pin 475 on the chain 350 actuates a switch 480 from its normally lower position to a raised position to effect the stopping of the main motor 109 and the starting of the motor 457 of the auxiliary drive 408 to feed the relatively long lengths 54 of wires. The switches 476 and 480 are supported on the side of the housing 200 adjacent the sprocket 452 and the outer free end of the pin 475 on the timing chain 350 is supported during a portion of its travel by a sprocket 481 (Fig. 7) spaced from and rotatable with the sprocket 352.

Figure 36:
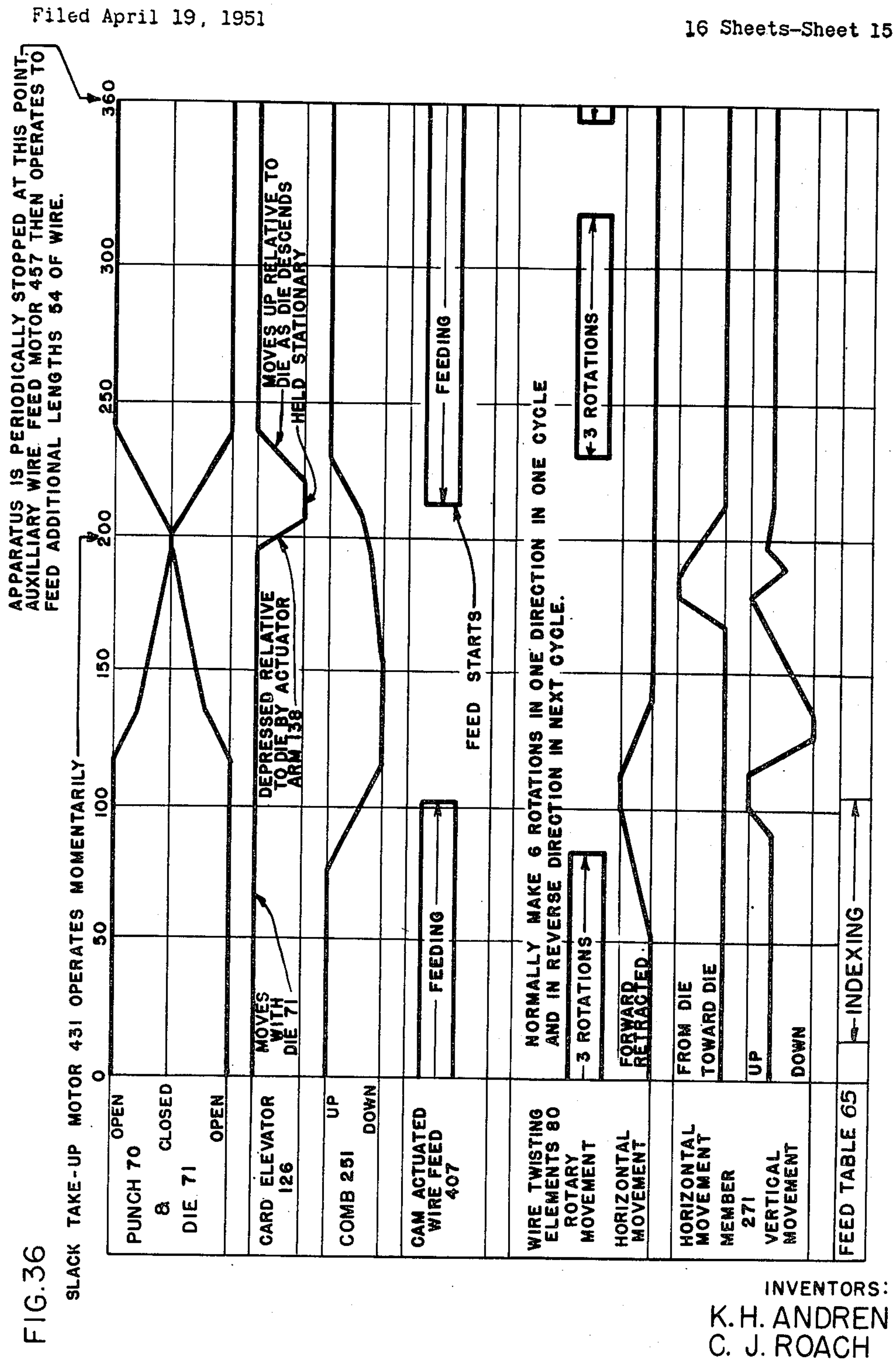
Fig. 36 is a cam chart.

The elements acting on the cards, the terminals and the wires during the attachment of the cards to the wire are synchronized for coordinated movement as indicated on the cam chart (Fig. 36) by the main cam shaft 205 so that for each revolution of the main cam shaft, the feed table 65 is indexed to feed a card 40 to the clinching station 68, the capstans 79 are rotated through a predetermined angular distance to advance the wires a predetermined distance through the clinching station 68, the twisting elements 80 are caused to rotate six revolutions to impart six twists or complete turns to each pair of wires, the twister elements are advanced horizontally to their forward position, the hold down and stripper plate 217 is moved upwardly into engagement with the wires 42 to support the wires, the comb 251 is lowered to cause the teeth thereof to move between the wires, the twisting elements 80 are retracted and in cooperation with the comb 251 serve to position portions of the wires 42 in vertical alignment with the sleeve forming portions 47 of the terminals 41, the vertically movable card holder 126 is moved upwardly to raise the card 40 from the card holder 66 into close proximity to the wires, the hold down member 217 is lowered into engagement with the card 40 to press it onto the pins 131 of the holder 126 and is moved upwardly with the card 40 thereunder during its upward movement after which it is moved forward and then downward and under the card to support the card and strip it from the pins 131 when the holder 126 recedes, and the punch and die are actuated to clinch the terminals 41 on the card onto the wires 42. Other components such as the timing chain 350 and the electrical control mechanism (Fig. 37) complete the control mechanism for coordinating the operation of the various elements of the apparatus and the auxiliary wire feed and the reversal of the wires of each pair of wires through successive cycles.

As indicated in the schematic diagram (Fig. 37) the main drive motor 109, the conveyor drive motor 120, the slack take up motor 431 and the wire feed motor 457 are connectible to a power line 485 for rotation in one direction through contacts 109F, 120F, 431F and 457F, respectively, which are associated with motor contactor coils M109F, M120, M431 and M457F, respectively. The main drive motor 109 and the wire feed motor 457 are also connectible to the power line 485 through contacts 109R and 457R of motor contactor coils M109R and M457R, respectively, for reversing the current in the armatures to provide for rapidly stopping the motors and the mechanism driven thereby. The solenoid 472 for actuating the latch 467 to lock the shaft 417 against rotation while the slack take up motor 431 is rotating is connected into the motor circuit for simultaneous energization with the motor 431. Centrifugally operated plugging switches PS–109 and PS–457 are associated with and driven by the motors 109 and 457, respectively. The plugging switches 109 and 457 which preferably are built into the motors are closed when the motors are running and are open when the motors stop.

Figure 37:
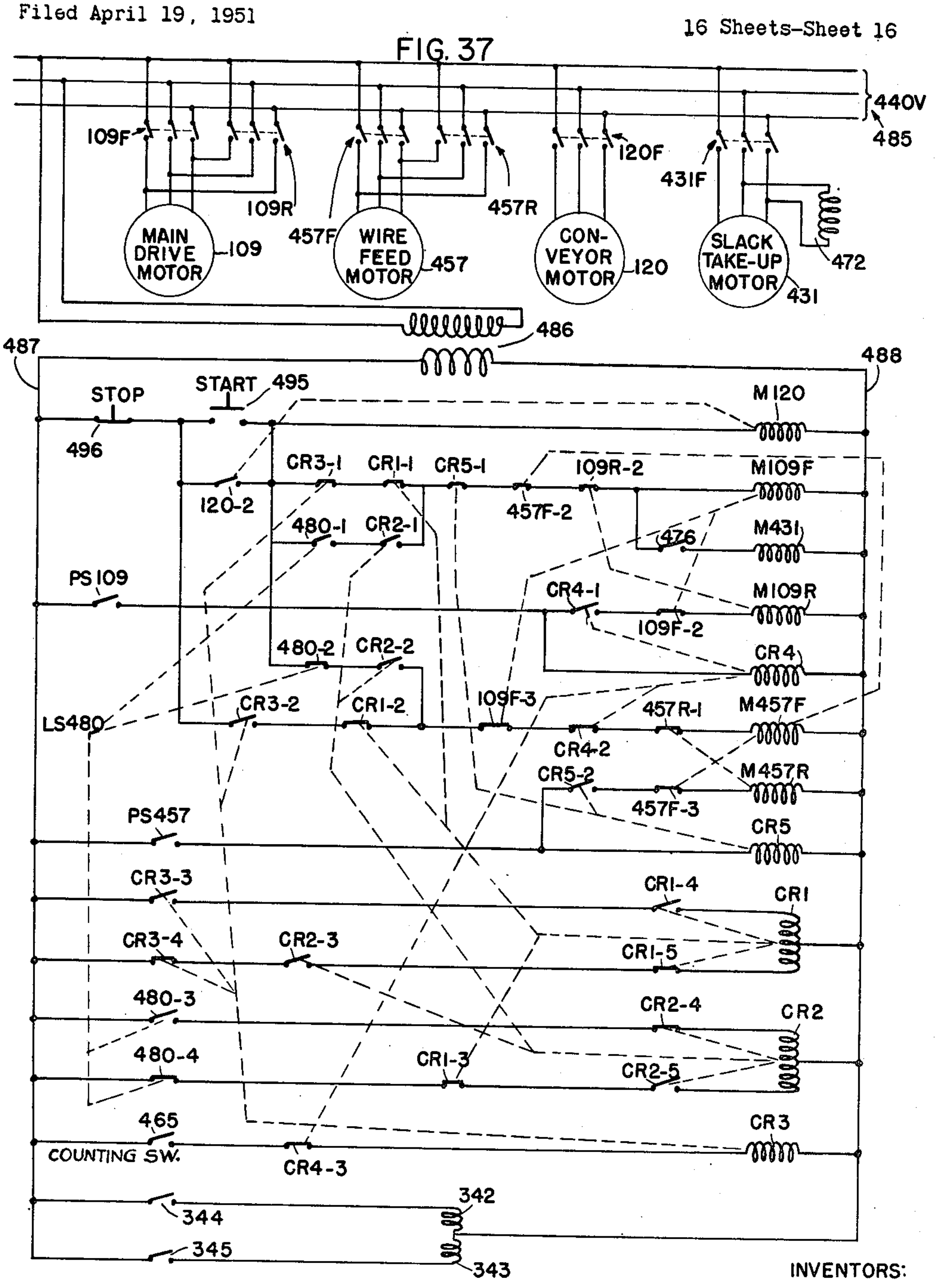
Fig. 37 is a schematic of the electrical portion of the apparatus.

The primary of a transformer 486 is connected across a pair of the power lines 485 and the secondary of the transformer has connected thereto a pair of power lines 487 and 488 to which the component parts of the electrical control mechanism are connected. The components of the control circuit in addition to the several contactor coils and the plugging switches include control relays CR1, CR2, CR3, CR4 and CR5, the contacts 480–1, 480–2, 480–3 and 480–4 of the limit switch 480, the limit switch 476 for starting the slack take up motor 431, and the counting switch 465. The solenoids 342 and 343 of the solenoid valve and the switches 344 and 345 associated therewith may also be connected to the power line 487 and 488. The several contactors, in addition to the contacts for connecting the several motors to the power line, have other contacts associated therewith as indicated in Fig. 37.

The control relays CR1 and CR2 are of a commercial type which have a plurality of contacts associated therewith, some of which are in closed position while others are in open position, and which are movable alternately from one position to another. Each of the relays CR1 and CR2 has a double coil, the upper part of which when momentarily energized moves the contacts to one position where they remain until the lower part of the coil is momentarily energized to move the contacts to the other position where they remain until the upper part of the coil is again energized. The electrical control mechanism is shown in the schematic diagram (Fig. 37) in the condition that occurs when the normally closed stop switch 496 of the machine has been momentarily operated to stop the machine in the position illustrated in Fig. 1, after having completed the fabrication of the ladder, and with the limit switch 480 raised to its upper position by the switch actuating pin 475 on the timing chain 350. With the limit switch 480 in its raised position, the contacts 480–1 and 480–3 are open and the contacts 480–2 and 480–4 are closed. In the condition shown in Fig. 37, the upper half of the coil of the contact relay CR1 had last been energized to pick up the relay CR1 and the contacts CR1–1, CR1–2, CR1–3 and CR1–5 are closed and the contacts CR1–4 are open. Similarly at this point in the cycle of operation the lower half of the relay coil CR2 had been energized last to drop CR2 and the contacts CR2–1, CR2–2, CR2–3 and CR2–5 are open and the contacts CR2–4 are closed.

A normally open start switch 495 is connected in series with a normally closed stop switch 496 and the contactor coil M120 across the power lines 487 and 488, and in response to the momentary closing of the start switch 495, the contactor coil M120 is energized to close the contacts 120F, thereby to connect the conveyor motor 120 to the power line 485 to start the conveyor belt 77 for carrying away the finished portions of the ladder 53 and for applying tension to the wires 42 tending to pull them through the clinching station 68 of the apparatus. Upon energization of the contactor coil M120, the contacts 120–2, which are shunted across the start switch 495, are closed to lock in the circuit through the contactor coil M120, the circuit remaining closed until broken by the opening of the stop switch 496. The momentary closing of the start switch 495 also completes a circuit across the lines 487 and 488 through the stop switch 496, the start switch 495 or the contacts 120–2, the closed contacts CR3–1, CR1–1, CR5–1, 457F–2, 109R–2 to the contactor coil M109F to energize the coil. In response to energization of coil M109F the contacts 109F–2 and 109F–3 are opened and the contacts 109F are closed to connect the main drive motor 109 to the power line 485 and start the motor in a forward direction.

With the main drive motor 109 running, the apparatus operates to fabricate the ladders 53, and the timing chain 350 moves the pin 475 away from the limit switch 480 and causes it to drop to its lower position and close contacts 480–1 and 480–3 and open contacts 480–2 and 480–4 thereof. When the contact 480–3 closes it completes a circuit through contacts CR2–4 to energize the upper half of coil CR2 and close contacts CR2–1, CR2–2, CR2–3, CR2–5 and open CR2–4. When the contacts CR2–3 are closed a circuit is completed through contacts CR3–4 and CR1–5 to energize the lower portion of the coil CR1 and open contacts CR1–1, CR1–2, CR1–3, CR3–5 and close CR1–4 With the opening of the contacts CR1–1, the holding circuit for the contactor coil M109F is transferred in part to contacts CR2–1 and 480–1 which are now closed.

As soon as the motor 109 starts up, the plugging switch PS109 will close to complete a circuit energizing control relay CR4 causing contacts CR4–1 to close and the contacts CR4–2 and CR4–3 to open. With the closing of the contact CR4–1, and with the plugging switch PS109 closed, a circuit is partially prepared to contactor coil M109R whereby in response to the closing of the contacts 109F–2 when the contactor coil M109F becomes deenergized, a circuit will be completed through PS109, CR4–1, 109F–2 to energize coil M109R to close the contacts 109R and momentarily reverse the current in the main drive motor 109 to plug the main drive motor to a quick stop.

However, with the main drive motor 109 running, the apparatus operates to fabricate a ladder and after a predetermined number of cards have been attached to the wires, the switch 344 is closed by the cam lug 348 on the timing chain 350 to energize solenoid 342 which actuates the valve 329 to cause the shifting of the rack 308 from its first position and thereby effects the reversal of the position of the wires of each pair of wires from the position of the wires of each pair of wires on the preceding card. The relationship of the wires of each pair of wires attached to the cards following the shifting of the rack from its first position will thus be reversed relative to the wires of each pair of wires on the cards preceding the shifting of the rack. When the last card of the ladder is being applied to the wires and as it is being gripped between the punch and the die during the clinching of the terminals onto the wires the limit switch 476 is closed for a relatively short time by the movement of the pin 475 on the timing chain 350 to close the circuit to the contactor coil M431 over a circuit from line 487 through stop switch 496, contacts 120–2, 480–1, CR2–1, CR5–1, 457F–2 and 109R–2 to line 488 to effect the operation of the slack take up motor 431. The movement of the pin 475 on the chain 350 maintains the switch 476 closed and the motor 431 running for a relatively short period of time sufficient to drive the capstan shaft 375 in a reverse direction for approximately one eighth of a revolution to take up the slack in the wires. When the required number of cards in the ladder have been attached to the wires the cam lug 349 on the chain 350 closes the switch 345 to energize solenoid 343 and to effect the actuation of the valve 329 and the shifting of the rack 308 from its second position to its first position to again reverse the relationship of the wires of each pair from what it was prior to the shifting of the rack.

After the last card of the ladder has been attached to the wires and shortly after the switch 345 has been actuated the pin 475 on the timing chain will raise the limit switch 480 and restore the contacts 480–1 to 480–4 to their positions shown in Fig. 37. As the contacts 480–1 are opened by the raising of the limit switch 480, the circuit to the contactor coil M109F is broken and the coil M109F is deenergized to open the contacts 109F and disconnect the main drive motor from the power line 485. In response to the deenergization of the contactor coil M109F, the contacts 109F–2 and 109F–3 are returned to their closed positions, and upon closing of the contacts 109F–2 a circuit is completed across the power lines 487 and 488 through a plugging switch 109 which is still closed, contacts CR4–1, to the contactor coil M109R to energize the coil M109R and close the contacts 109R to reverse the current through the main drive motor 109 cause the main motor to come to a quick stop.

As a result of the stopping of the main drive motor 109, the plugging switch PS109 is opened to break the circuit to the control relay CR4 and cause its deenergization, and effect the opening of contacts CR4–1 and the closing of contacts CR4–2 and CR4–3. With the closing of the contacts CR4–2 as a result of the deenergization of CR4 and the stopping of the main drive motor 109, a circuit is completed across the power lines 487, 488 through stop switch 496, contacts 120–2, 480–2, CR2–2, 109F–3, CR4–2, 457R–1 to energize the contactor coil M457F and open contacts 457F–2 and 457F–3, and close contacts 457F. With the closing of the contacts 457F, the wire feed motor 457 is connected to the power line 485 for forward rotation to cause the rotation of the capstan drive shaft 275 to feed the relatively long lengths of wire 54 between the ladders 53.

In response to the forward rotation of the wire feed motor 457, the plugging switch PS457 is closed and completes a circuit across the power line 487 and 488 through the control relay CR5 to energize CR5 and open the contacts CR5–1 and close the contacts CR5–2. With the closing of the contact CR5–2, a circuit to the contactor coil M457R is partially completed so that when contacts 457F–3 are closed in response to the deenergization of coil M457F and the disconnection of the wire feed motor 457, current will flow through lines 487, 488, PS–457, contacts CR5–2 and 457F–3 to energize the coil M457R to close the contacts 457R to effect the reversal of current in the motor 457 to plug the motor to a quick stop.

The counting device 462 is driven and the counting switch 465 is closed in response to the forward rotation of the motor 457 and a circuit is completed across the power lines 487, 488 and through the switch 465, contacts CR4–3 to the control relay CR3 to energize the control relay CR3 and close the contacts CR3–2, CR3–3 and open CR3–1 and CR3–4. With the closing of contacts CR3–3, a circuit is completed through contacts CR1–4 to the upper half of the coil CR1 to again pick up control relay CR1 and close the contacts CR1–1, CR1–2, CR1–3, CR1–5 and open contacts CR1–4. With the closing of contacts CR1–3, a circuit is completed across the power lines 487, 488 through contacts 480–4, CR2–5 and the lower half of coil CR2 to drop the control relay CR2 and open contacts CR2–1, CR2–2, CR2–3, CR2–5 and close contacts CR2–4. With the opening of the contacts CR2–2, and the closing of contacts CR3–2 and CR1–2, a part of the circuit to the contactor coil M457F has now been transferred to the contacts CR3–2 and CR1–2, the balance of the circuit including the stop switch 496 and the contacts 109F–3, CR4–2 and 457R–1. As the wire feed motor 457 rotates, the capstans 79 are driven thereby to feed the relatively long portions 54 of the wires 42, the element 464 of the counting device is driven in timed relation thereto, and when the required number of feet of wire 42 have been fed, as determined by the setting of the counting device 462, the element 464 will actuate the switch 465 to open position. With the opening of switch 465 the relay CR3 is deenergized and the contacts CR3–2 are opened to break the circuit to deenergize the contactor coil M457F and cause the closing of the contacts 457F–2 and 457F–3 and the opening of the contacts 457F. With the opening of the contacts 457F, the wire feed motor 457 is disconnected from the power line 485, and with the closing of the contacts 457F–3, a circuit is completed through the plugging switch PS457, which is still closed, and the contacts CR5–2, to energize contactor coil M457R and close the contacts 457R. The closing of the contact 457R reverses the current in the armature of the motor 457 and causes the motor 457 to come to a quick stop. With the stopping of the motor 457 the relatively long lengths 54 of wire have been fed and the fabrication of a complete ladder 53 has been completed.

When the control relay CR3 was deenergized and the contacts CR3–2 were opened to effect the stopping of the motor 457, the contacts CR3–1 were moved to their closed position, and since the stop switch 496 and the contacts 120–2, CR1–1, CR5–1, 457F–2, 109R–2 are also closed, a circuit is complete to energize the contactor coil M109F and close the contacts 109F and again start the main drive motor 109 and initiate another cycle of operation.

It will thus be seen from the above description that in response to the temporary closing of the start switch 495, the apparatus will operate to fabricate successive ladders 53 separated from each other by relatively long lengths of lead wires 54, and that during the fabrication of each ladder of ten cards, after the fifth card of each ladder has been attached to the wires, the rack 308 will be shifted from its first position to change the relationship of the wires of each pair of wires relative to their relation on the preceding card, and after the last card of each ladder has been attached to the wires, the rack 308 is shifted back to its first position to again reverse the wires of each pair of wires to their first position, and that while the last card of each ladder is being gripped between the punch and die, the slack take up motor 431 operates for a short period of time to take up slack in the wires 42.

It is to be understood that the above-described arrangements are simply illustrative of the application of the principles of this invention. Numerous other arrangements may be readily devised by those skilled in the art which will embody the principles of the invention and fall within the spirit and scope thereof.

What is claimed is:

1. In an apparatus for attaching terminals to wires, the combination of means for intermittently feeding cards having a plurality of terminals thereon to a clinching station, guides for guiding pairs of strands of wire above terminals on a card at said clinching station, means for clinching the terminals on said card to said wires, feed means for selectively advancing the pairs of wires and cards attached to the wires various distances after successive clinching operations to attach the cards to the wires in groups of cards separated from adjacent groups by relatively long lengths of wire, means for twisting the pairs of wires about themselves through a predetermined uniform number of turns as the wires are moved from said station after successive cards have been attached thereto, means selectively operable for cooperation with said means for twisting the wires to change the number of turns of twist imparted to said wires at selected intervals to change the relationship of the wires of each pair of wires to corresponding terminals on adjacent cards preceding and following said intervals of change, and means for coordinating the movements of all of said means for successive operation.

2. In an apparatus for attaching cards having a plurality of terminals thereon to a plurality of wires comprising means for feeding said cards to a predetermined station, means for intermittently advancing said wires predetermined distances through said station, means for intermittently attaching the terminals to said wires at said station, a plurality of rotatable twisting elements geared together for simultaneous rotation, each of said elements having means for guiding a pair of wires therethrough, means including a device movable back and forth through a stroke of predetermined length for rotating said elements through predetermined uniform angular movements to twist said pairs of wires about themselves through a predetermined uniform number of turns, said device having an element movable to and from first and second positions and reciprocable with said device in said first and said second positions through said strokes of said predetermined length and operable for changing the angular relationship of the rotation of said twisting elements and the twist imparted to the wires when said element is moved from one to the other of said positions, and control means for selectively actuating said device to cause the shifting of said element to either position to effect the attachment of the wires of each pair of wires to corresponding pairs of terminals on some of the cards in one relationship and on other cards in the reverse relationship.

3. In an apparatus for attaching terminals to wires, the combination of means for intermittently feeding cards having a plurality of terminals thereon to a clinching station, means for guiding a plurality of continuous strands of wire above the terminals on a card at said clinching station, means for clinching the terminals on said cards to said wires, a first feed means for intermittently advancing said wire and the cards attached thereto through uniform distances after each clinching operation, a second feed means for advancing said wires and the cards attached thereto a predetermined distance, means for selectively rendering said first feed means and said second feed means alternately operable and inoperable to selectively vary the spacing of the cards on the wires, and means for coordinating the movement of all of said means for successive operations.

4. In an apparatus for attaching terminals to wires, the combination of means for intermittently feeding cards having a plurality of terminals thereon to a clinching station, means for guiding a plurality of continuous strands of wire above the terminals on a card at said clinching station, means for clinching the terminals on said cards to said wires, a first feed means for intermittently advancing said wire and the cards attached thereto through uniform distances after each clinching operation, a second feed means for advancing said wires and the cards attached thereto, means for selectively rendering said first feed means and said second feed means operable and inoperable to cause the cards to be attached to the wires in successive groups, means for selectively varying the extent of advance of the wires by said second feed means, and means for coordinating the movement of all of said means for successive operations.

5. In an apparatus for attaching cards having terminals thereon to a plurality of wires the combination of a punch and die for clinching the terminals on the cards to the wires, means for intermittently feeding cards to a position between said punch and die, means for actuating said punch and die, means for selectively advancing the wires and the cards attached to the wires various distances after successive clinching operations to permit the attachment of cards to the wires in groups of cards separated from adjacent groups by relatively long lengths of wire, a plurality of rotatable twisting elements each adapted to guide a pair of wires therethrough, means for supporting said elements for rotation and for axial movement to and from an advance position with the ends thereof in the path of movement of said punch and die and a retracted position with the ends thereof out of the path of movement of said punch and die, means for intermittently rotating said twisting elements in timed relation to the actuation of said punch and die to twist the wires of each pair about each other between successive cards, a comb having a plurality of teeth engageable between said wires to position said wires in a predetermined relation to each other and said punch and die, means for moving said comb parallel to the movement of said punches and adjacent thereto to position the teeth between the wires extending from said twisting elements after the pairs of wire have been twisted and the twisting elements are in their forward position, means for actuating said twisting elements axially to move them to their retracted position to provide clearance for said punch and die and in cooperation with said comb to position portions of each pair of wires in vertical alignment with the terminals on said card at said clinching station, and means to coordinate the movements of said punch and die and all of said means for successive operations.

6. In an apparatus for attaching cards having terminals thereon to a plurality of wires the combination of a punch and die reciprocable relative to each other for clinching the terminals on the cards to the wires, means for successively feeding said cards to a clinching station between said punch and die, means for intermittently advancing said wires between said punch and die and above the terminals on a card in said clinching station, a plurality of rotatable twisting elements each having apertures for guiding a pair of wires therethrough, means for supporting said elements for rotation and axial movement to and from a forward position with the ends thereof in the path of movement of said punch and die and a retracted position with the ends thereof out of the path of movement of said punch and die, means for intermittently rotating said twisting elements in opposite directions alternately between successive reciprocation of said punch and die to twist the wires of each pair about each other in opposite directions alternately between successive cards, a comb disposed adjacent the path of movement of said punch and die and having a plurality of teeth engageable between the wires as said wires leave the twisting elements to position said wires in predetermined relation to each other, means for moving said comb to position said teeth between the wires extending from said twisting elements after the pairs of wire have been twisted and the twisting elements are in their forward position, means for actuating said twisting elements axially to move them to said retracted position to provide clearance for said punch and die and in cooperation with said comb to position portions of each pair of wires in vertical alignment with the terminals on said card at said clinching station, and means to coordinate the movement of said punch and die and said means for successive operations.

7. In an apparatus for attaching a plurality of cards having terminals thereon to a plurality of continuous wires the combination of a punch and die for clinching the terminals on the cards onto the wires, means for successively feeding said cards to a clinching station between said punch and die, means for intermittently advancing said wires between said punch and die, a plurality of rotatable twisting elements each having a pair of apertures for guiding a pair of wires therethrough, means for supporting said elements for rotation and for axial movement to and from an advanced position with the ends thereof in the path of movement of said punch and die and a retracted position with the ends thereof out of the path of movement of said punch and die, means for intermittently rotating said twisting elements in opposite directions alternately between reciprocations of said punch and die to twist the wires of each pair about each other through a predetermined number of turns in opposite directions alternately between successive cards, means for changing at selected intervals the number of twists imparted to said pairs of wires to change the relationship of the wires of each pair of wires to corresponding terminals on the cards before and after said change, a comb having a plurality of teeth, means for moving said comb to position the teeth thereon between the wires extending from said twisting elements when the twisting elements are in their advanced position and after the pairs of wire have been twisted, means for actuating said twisting elements axially to move them to said retracted position to provide clearance for said punch and die and in cooperation with said comb to position portions of each pair of wires in vertical alignment with the terminals on said card at said clinching station, and drive means to actuate said punch and die and all said means in timed relation to each other.

8. In an apparatus for attaching cards having terminals thereon to strands of wire at intervals along the strand, the combination of a carrier for intermittently feeding cards to a clinching station, feeding mechanism for intermittently advancing said wires in a predetermined path through said clinching station and above a card in said station, a punch and die means for clinching the terminals on said card to said wires at said clinching station, a plurality of twisting elements each having recesses for receiving a pair of wires therein, means for rotating said elements to twist said pairs of wire through a predetermined angular distance alternately in opposite directions after successive clinching operations, means for moving said elements horizontally to and from forward and retracted positions in and out of the path of movement of said punch and die, a comb vertical movable into engagement between the wires at points adjacent the twisting elements after the elements have twisted the pairs of wires and are in their forward positions, said elements being retractable and cooperating with said comb to position portions of said wires in alignment with the terminals on the card in said clinching station, a vertically movable transfer member for raising the card from said carrier into close proximity to the wires, a stripper member movable to support the wires as the comb is moved into the wire and movable to press the cards onto the transfer member as the transfer member raises the card from the carrier to the wires and also movable forward and under the card to strip the card from the transfer member as the transfer member recedes, and drive means for coordinating the movements of the elements acting on the product for successive operations.

9. In an apparatus for attaching a plurality of elements in spaced relation to each other onto a plurality of continuous wires, the combination of means for intermittently feeding cards having terminals thereon to a predetermined position, means for intermittently attaching said terminals to wires at said predetermined position, means on one side of said predetermined position for applying a tension to said wires tending to advance said wires in a predetermined path through said predetermined position, a shaft on the other side of said predetermined position, a plurality of capstans on said shaft for engaging said wires for alternately holding and moving said wires, means for effecting a positive driving connection between said wires and said capstans for advancing said wires in response to rotation of said capstans in a forward direction and for effecting a yieldably disconnectible driving connection between said wires and said capstans in response to rotation of said capstans in a reverse direction, drive means for intermittently rotating said capstans in a forward direction to advance measured lengths of said wires, and drive means for intermittently turning said capstans in a reverse direction to retract the wires and take up the slack therein.

10. In an apparatus for attaching cards having terminals thereon to wires at a predetermined station, the combination of means for intermittently feeding cards to said station, a punch and die reciprocable relative to each other for intermittently attaching the cards to said wires at said station, means on one side of said station for applying a tension to said wires tending to advance said wires through said station, a plurality of capstans on the other side of said station, a capstan shaft for supporting said capstans, a forward drive shaft, a reverse drive shaft, differential drive means interconnecting said forward and said reverse drive shafts and said capstan shaft, means for rotating said reverse drive shaft to impart reverse movement to said capstan shaft and said capstans to take up the slack in said wires, means for locking said forward drive shaft while said reverse drive shaft is being driven, means for locking said reverse drive shaft when said shaft is not rotating, means including a rack reciprocable in timed relation to said punch and die for rotating the forward drive shaft and the capstans to unwind and advance uniform lengths of wires, an auxiliary drive for rotating said forward drive shaft and the capstans to unwind and advance the wires measured distances, and means for coordinating the operation of the elements to cause the cards to be attached to the wires in groups separated from adjacent groups by relatively long lengths of wire and to take up the slack in said wires at intervals.

11. In an apparatus for attaching cards having terminals thereon to wires at a predetermined station, the combination of means for intermittently feeding cards to said station, a punch and die reciprocable relative to each other for intermittently attaching the cards to said wires at said station, means on one side of said station for applying a tension to said wires tending to advance said wires through said station, a plurality of capstans, a capstan shaft for supporting said capstans on the other side of said station, a forward drive shaft, a reverse drive shaft, a differential drive means interconnecting said forward and said reverse drive shafts, means interconnecting said differential drive and said capstan shaft, means for rotating said reverse drive shaft to impart reverse movement to said capstan shaft to take up the slack in said wires, means for locking said forward drive shaft while said reverse drive shaft is being driven, means for locking said reverse drive shaft when said shaft is not rotating, means including a rack reciprocable in timed relation to said punch and die for intermittently rotating the forward drive shaft and the capstans to unwind and advance uniform lengths of wires, an auxiliary drive including a motor for rotating said forward drive shaft and the capstans to unwind and advance measured lengths of wires, and a settable control device cooperating with said auxiliary drive for selectively controlling the length of said measured lengths of wires.

12. In an apparatus for attaching cards having terminals thereon to a plurality of pairs of wires at a predetermined station, the combination of means for intermittently feeding cards to said station, means for clinching the terminals on said cards to said wires at said station, drive means for intermittently actuating said clinching means, means on one side of said station for applying tension to said wires tending to advance said wires through said station, a plurality of capstans positioned on the opposite side of said station for controlling the feed of said wires, a first capstan drive means operable in timed relation to said drive means for actuating said capstans to advance said wires uniform distances after the attachment of successive cards thereto, a second capstan drive means independent of said first capstan drive means for actuating said capstans to advance said wires through predetermined distances, and control means settable to render said first and said second capstan drive means alternately operable and inoperable to selectively vary the spacing of the cards on said wires.

13. In an apparatus for attaching cards having terminals thereon to a plurality of pairs of wires at a predetermined station, the combination of means for intermittently feeding cards to said station, means for clinching the terminals on said cards to said wires at said station, drive means for intermittently actuating said clinching means, means on one side of said station for applying tension to said wires tending to advance said wires through said station, a plurality of capstans positioned on the opposite side of said station for controlling the feed of said wires, a first capstan drive means operable in timed relation to said drive means for actuating said capstans to advance said wires uniform distances after the attachment of successive cards thereto, a second capstan drive means independent of said first capstan drive means for actuating said capstans to advance said wires through predetermined distances, control means settable to render said first and said second capstan drive means alternately operable and inoperable to effect the feeding of extra sections of said wires after the attachment of successive selected numbers of cards to said wires, and a settable control means for said second capstan drive means for selectively controlling the length of said extra sections of wires.

14. In an apparatus for attaching cards having terminals thereon to a plurality of pairs of wires at a predetermined station, the combination of means for feeding cards to said station, means for clinching the terminals on said cards to said wires at said station, drive means for intermittently actuating said clinching means, means on one side of said station for applying tension to said wires tending to advance said wires through said station, a plurality of capstans positioned on the opposite side of said station for controlling the feed of said wires, a first capstan drive means operable in timed relation to said drive means for turning said capstans in one direction to advance said wires uniform distances, a second capstan drive means independent of said first capstan drive means for turning said capstans in said one direction to advance said wires through predetermined distances, reverse drive means for turning said capstans in a reverse direction, means on said capstans for effecting a releasable engagement with the wires to positively advance said wires in response to turning of said capstan in said one direction and to yieldably retract said wires to remove the slack therein in response to turning movement of said capstan in a reverse direction, and means for actuating said first drive means, said second drive means, and said reverse drive means in a predetermined sequence.

15. In an apparatus for attaching cards having a plurality of pairs of terminals thereon to a plurality of pairs of wires, the combination of a plurality of twisting elements mounted for rotation, each of said elements having apertures therein for guiding a pair of wires therethrough, means interconnecting said elements for simultaneous rotation, a composite motion transmitting device comprising a first member and a second member mounted on the first member for movement relative thereto to and from a forward position and a retracted position and for movement with said first member in said forward and said retracted positions, actuating means engageable with said one member for moving said device back and forth through a predetermined stroke, and means interconnecting said second member and one of said twisting elements for imparting a predetermined rotary movement to said twisting elements alternately in opposite directions in response to said back and forth movement of said device, said device with said second member in said forward position serving to dispose the twisting elements in a predetermined angular relationship at the end of each of said rotary movements, and said device with said second member in said retracted position serving to dispose the twisting elements in another angular relationship at the end of said rotary movements, means for selectively moving said second member to and from said forward and said retracted positions on said first member of said device for selectively effecting the attachment of the wires of each pair to the corresponding pairs of terminals on some of the cards in one relationship and on other cards in the reverse relationship.

16. In an apparatus for attaching cards having a plurality of pairs of terminals thereon to a plurality of pairs of continuous wires and having means for feeding cards to a clinching station, means for clinching the terminals onto the wires at said station, and means for intermittently advancing said wire through said station, the combination therewith of a plurality of twisting elements mounted for rotation, each of said elements having apertures therein for guiding a pair of wires therethrough, means interconnecting said elements for simultaneous rotation, a motion transmitting device comprising a first member and a second member mounted on the first member for movement relative thereto to and from a forward positon and a retracted position and for movement with said first member in said forward and in said retracted positions, actuating means engageable with said one member for moving said composite motion transmitting device back and forth through a predetermined stroke, means interconnecting said second member and one of said twisting elements for imparting a predetermined rotary movement to said twisting elements alternately in opposite directions in response to said back and forth movement of said device, said device with said second member in said forward position serving to dispose the twisting elements in a first angular relationship at the end of each of said rotary movements, said device with said second member in said retracted position serving to dispose the twisting elements in a second angular relationship at the end of said rotary movement 180° from said first relationship, an acuator for moving said second member to and from said forward and said retracted positions on said first member of said device, and means for controlling the actuation of said actuator to effect the selective attachment of the wires of each pair to the corresponding pairs of terminals on some of the cards in one relationship and on other cards in the reverse relationship.

17. In an apparatus for attaching cards having a plurality of pairs of terminals thereon to a plurality of pairs of continuous wires and having means for feeding cards to a clinching station, means for clinching the terminals onto the wires at said station, and means for intermittently advancing said wires through said station, the combination of a plurality of twisting elements mounted for rotation, each of said elements having apertures therein for guiding a pair of wires therethrough, means interconnecting said elements for simultaneous rotation, a composite motion transmitting device comprising a first member and a second member mounted on the first member for movement relative thereto to and from a forward position and a retracted position and for movement with said first member in said forward and said retracted positions, actuating means engageable with said one member for moving said composite motion transmitting device back and forth through a predetermined stroke, a rack operatively connected to said second member and one of said twisting elements for imparting a predetermined rotary movement to said twisting elements alternately in opposite directions in response to said back and forth movement of said device, said device with said second member in said forward position serving to dispose the twisting elements in a first angular relationship at the end of each of said rotary movements, and said device with said second member in said retracted position serving to dispose the twisting elements in a second angular relationship substantially one half revolution from said first relationship at the end of said rotary movements, a fluid actuator comprising a piston connected to one of said members and a cylinder connected to the other member for moving said second member to and from said forward and said retracted positions of said first member of said device, valve means associated with said fluid actuator and operable to effect the movement of said second member to and from said forward and said retracted positions, and control means for selectively actuating the valve and the fluid actuator to effect the attachment of the wires of each pair of wires to corresponding terminals on some of the cards in one relationship and on the other cards in the reverse relationship.

18. An apparatus for making a string of interconnected components of electrical switching equipment with pairs of insulated wires and cards having pairs of terminals thereon in insulated and overlapping relation which comprises means for intermittently feeding said cards successively to a predetermined position, means for selectively advancing said pairs of wires the same or different distances in timed relation to the feeding of said cards and in alignment with the pairs of terminals on a card at said predetermined position, means for attaching the terminals of successive cards onto said wires at said predetermined position to establish electrical connections therebetween and to form groups of cards on said wires separated from adjacent groups by relatively long lengths of wires, means for twisting each pair of wires between cards a predetermined number of complete turns, and means for controlling the twisting means at selected intervals to vary the number of twists applied to the pairs of wires between adjacent cards by one-half turn to effect the attachment of the wires of each pair to corresponding pairs of terminals on predetermined cards in one relationship and on the other cards in the reverse relationship.

References Cited in the file of this patent

UNITED STATES PATENTS

| | | |
|---|---|---|
| 1,896,661 | Breece | Feb. 7, 1933 |
| 2,438,959 | Bartelheim et al. | Apr. 6, 1948 |
| 2,491,228 | Swift | Dec. 13, 1949 |
| 2,551,358 | Andren | May 1, 1951 |